US012668513B2

(12) United States Patent
Tsutano et al.

(10) Patent No.: US 12,668,513 B2
(45) Date of Patent: Jun. 30, 2026

(54) IMPURITY ACQUISITION SYSTEM, WATER QUALITY TESTING SYSTEM, AND LIQUID PRODUCTION AND SUPPLY SYSTEM

(71) Applicant: ORGANO CORPORATION, Tokyo (JP)

(72) Inventors: Kyohei Tsutano, Tokyo (JP); Akihiko Tsuda, Tokyo (JP); Hiroshi Sugawara, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 386 days.

(21) Appl. No.: 18/275,149

(22) PCT Filed: Jan. 17, 2022

(86) PCT No.: PCT/JP2022/001263
§ 371 (c)(1),
(2) Date: Jul. 31, 2023

(87) PCT Pub. No.: WO2022/168571
PCT Pub. Date: Aug. 11, 2022

(65) Prior Publication Data
US 2024/0101448 A1      Mar. 28, 2024

(30) Foreign Application Priority Data

Feb. 5, 2021      (JP) ................................. 2021-017488

(51) Int. Cl.
*C02F 1/42*      (2023.01)
(52) U.S. Cl.
CPC ...................................... *C02F 1/42* (2013.01)

(58) Field of Classification Search
None
See application file for complete search history.

(56) References Cited

U.S. PATENT DOCUMENTS

| | | | | | |
|---|---|---|---|---|---|
| 5,061,374 | A | * | 10/1991 | Lewis | .................. B01D 61/026 |
| | | | | | 210/686 |
| 2021/0247373 | A1* | | 8/2021 | Tsutano | .................... B01J 39/20 |
| 2021/0395106 | A1* | | 12/2021 | Yamashita | ........... G01N 1/2035 |

FOREIGN PATENT DOCUMENTS

| | | | |
|---|---|---|---|
| JP | 05-232094 A | | 9/1993 |
| JP | 07-198695 A | | 8/1995 |
| JP | 2001153854 A | * | 6/2001 |
| JP | 2009-281796 A | | 12/2009 |
| KR | 10-2020-0119297 A | | 10/2020 |
| TW | 202006331 A | | 2/2020 |

(Continued)

OTHER PUBLICATIONS

Machine generated English translation of JP2001153854A (Year: 2001).*

(Continued)

*Primary Examiner* — Benjamin L Lebron
*Assistant Examiner* — Bernadette Karen Mcgann
(74) *Attorney, Agent, or Firm* — GREENBLUM & BERNSTEIN, P.L.C.

(57) ABSTRACT

An ion exchanger unit that adsorbs impurities in a liquid to be tested, and a controller that switches between causing the flow of the liquid to be tested into the ion exchanger unit and the flow of eluent to elute the impurities adsorbed in the ion exchanger unit into the ion exchanger unit.

6 Claims, 32 Drawing Sheets

(56)     References Cited

FOREIGN PATENT DOCUMENTS

| WO | WO-2019221186 A1 | * | 11/2019 | ............. | G01N 33/18 |
| WO | WO-2020080461 A1 | * | 4/2020 | ................ | C02F 1/42 |

OTHER PUBLICATIONS

Office Action, dated Jun. 24, 2025, in Taiwanese family member. Application No. 111103041, with English language translation thereof.
International Search Report issued Apr. 5, 2022 in International Bureau of WIPO Patent Application No. PCT/JP2022/001263, with an English translation thereof.
Written Opinion issued Apr. 5, 2022 in International Bureau of WIPO Patent Application No. PCT/JP2022/001263, with an English translation thereof.
Office Action, dated May 29, 2025, in Korean family member application No. 10-2023-7029269 with English language translation thereof.
Office Action, dated Apr. 22, 2025, in Taiwanese family member application No. 111103041 with English language translation thereof.

* cited by examiner from ultrapure water production facility          to semiconductor cleaning equipment from S15

S261
Control shutoff valve 333

S262
Control shutoff valve 323

S263
Control shutoff valve 340

S264
Reset flow meter 600

S265
Flow rate has reached threshold value?    No

Yes to S12

IMPURITY ACQUISITION SYSTEM, WATER QUALITY TESTING SYSTEM, AND LIQUID PRODUCTION AND SUPPLY SYSTEM

TECHNICAL FIELD

This invention relates to an impurity acquisition system, a water quality testing system, and a liquid production and supply system.

BACKGROUND OF ART

In general, one method of testing the quality of ultrapure water supplied from ultrapure water production facilities to a point of use (e.g., a point of use in semiconductor cleaning equipment) is to use analysis by a concentration method that uses ion exchangers. As an analysis method that has been considered that uses such a concentration method, the quality of ultrapure water is tested by passing ultrapure water through an ion exchanger for a predetermined period, removing and retrieving the ion exchanger, eluting impurities from the retrieved ion exchanger, and measuring their concentration (e.g., see Patent Document 1).

PRIOR ART DOCUMENTS

Patent Documents

Patent Document 1: Patent Publication No. 2001-153854

SUMMARY OF THE INVENTION

Problem to be Solved by the Invention

In the technology described above, the ion exchanger must be removed to test the quality of ultrapure water, and this procedure is time-consuming. As a result, efficient inspections cannot be performed.

The purpose of the present invention is to provide an impurity acquisition system, a water quality testing system, and a liquid production and supply system that enables efficient testing of water quality of liquids.

Means for Solving the Problem

An impurity acquisition system of the present invention for acquiring impurities in a liquid to be tested comprising:
   an adsorbent that adsorbs impurities in the liquid to be tested; and
   a first controller that switches between the flow of the liquid to be tested into the adsorbent and the flow of eluent into the adsorbent for eluting the impurities adsorbed on the adsorbent.

Further, an impurity acquisition system of the present invention for acquiring impurities in a liquid to be tested, comprising:
   a plurality of adsorbents that are arranged in parallel with each other and that adsorb impurities in the liquid to be tested; and
   a control device that switches the flow of the liquid to be tested to the plurality of adsorbents.

Further, a water quality testing system of the present invention, comprising:
   an impurity acquisition system that has an adsorbent that adsorbs impurities in liquid to be tested and a first controller that switches between the flow of the liquid to be tested into the adsorbent and the flow of eluent into the adsorbent for eluting the impurities adsorbed on the adsorbent; and
   an information processing device that analyzes the concentration of impurities in the eluent that has passed through the adsorbent and calculates the concentration of impurities in the liquid that was tested based on the concentration of impurities.

Further, a liquid production and supply system of the present invention, comprising:
   a water quality testing system has an impurity acquisition system that has an adsorbent that adsorbs impurities in liquid to be tested and a first controller that switches between the flow of the liquid to be tested into the adsorbent and the flow of eluent into the adsorbent for eluting the impurities adsorbed on the adsorbent and an information processing device that analyzes the concentration of impurities in the eluent that has passed through the adsorbent and calculates the concentration of impurities in the liquid that was tested based on the concentration of impurities;
   a valve section that controls supply of the liquid to be tested from a liquid production and supply facility that performs at least one of the production and supply of the liquid to be tested to a point of use where the liquid to be tested is used; and
   a second controller that controls the valve section based on the concentration of impurities calculated by the information processing device.

Advantageous Effects of the Invention

In the present invention, the water quality of liquids can be tested efficiently.

DESCRIPTION OF THE EMBODIMENTS

Embodiments of the invention are next described with reference to the drawings.

First Embodiment

Figure 1:
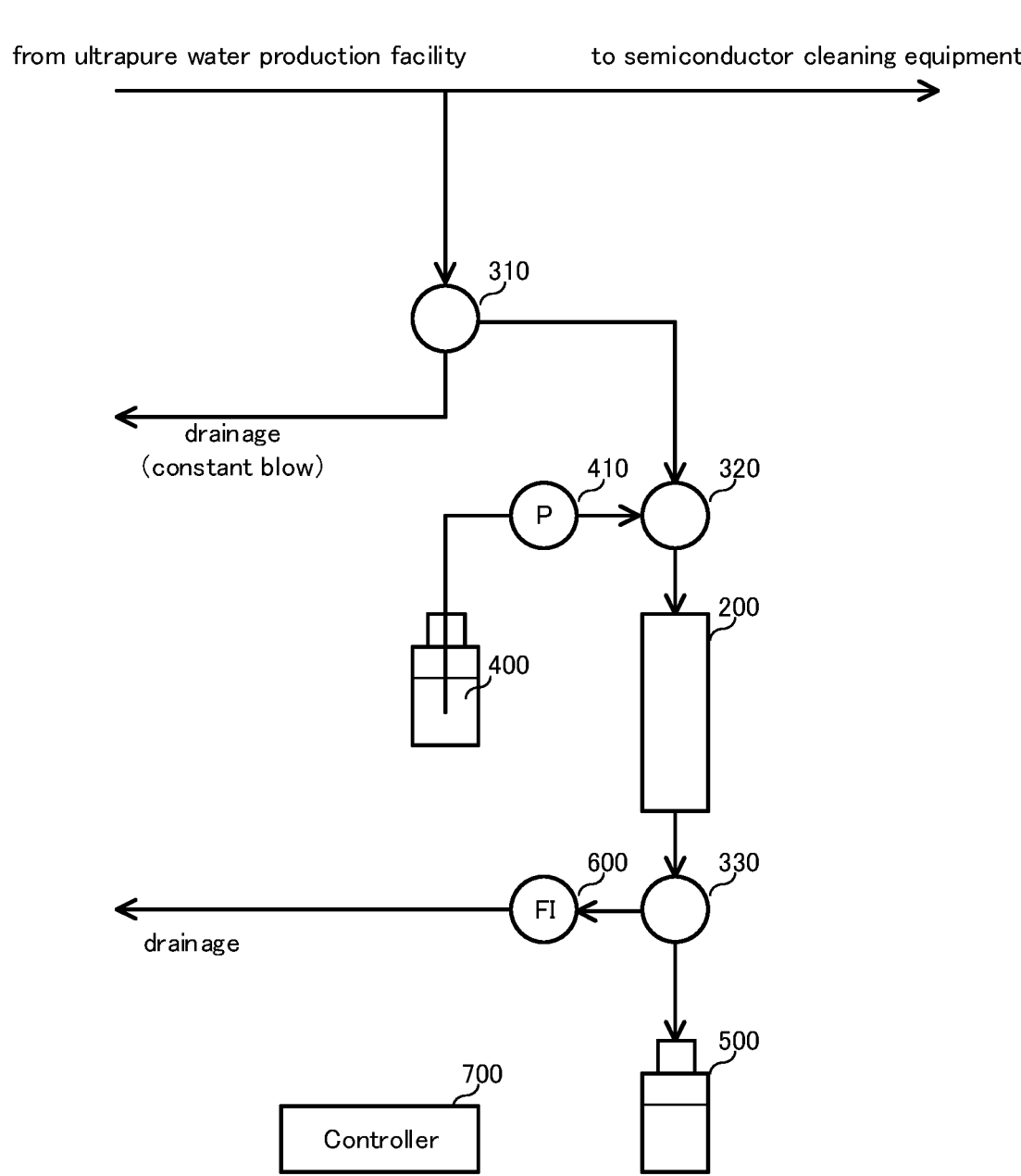
FIG. 1 is a diagram showing a first embodiment of an impurity acquisition system of the present invention.

FIG. 1 is a diagram showing a first embodiment of an impurity acquisition system of the present invention. As shown in FIG. 1, the impurity acquisition system in this embodiment has ion exchanger unit (ion exchanger) 200, which is an adsorbent, shutoff valves 310, 320, and 330, eluent 400, pump 410, collection container 500, flow meter 600, and control unit 700.

Ion exchanger unit 200 is a unit that adsorbs impurities from the water to be tested from an ultrapure water production facility. Here, the ultrapure water production facility, for example, produces ultrapure water to be supplied to semiconductor cleaning equipment, which is the point of use, and supplies the ultrapure water. In the following description, this ultrapure water is the liquid to be tested (water to be tested), and the water to be tested is ultrapure water supplied from the ultrapure water production facility. Ion exchanger unit 200 has an ion removal or ion adsorption function (e.g., an ion adsorption membrane or a monolithic organic porous ion-exchange resin). The objects to be removed or adsorbed by ion exchanger unit 200 are impurities. These impurities include ions (ionic metal impurities) and particulate forms. In this embodiment, the functional group of ion exchanger unit 200 is a cation or anion exchange group or a chelate compound.

Shutoff valve 310 controls the flow into ion exchanger unit 200 of water to be tested, this water being supplied from the ultrapure water production facility to the semiconductor cleaning equipment. Specifically, according to control signals from controller 700, shutoff valve 310 causes, of water that is supplied from the ultrapure water production facility to the semiconductor cleaning equipment, water that is to be tested to flow either to the drainage or to a first distribution pipe, which is the flow path to ion exchanger unit 200 through shutoff valve 320. Here, the flow path from the ultrapure water production facility to shutoff valve 310 may also be included in the first distribution pipe. Shutoff valve 320 is the first valve section that switches and controls the flow of either the water to be tested through shutoff valve 310 or the elution liquid, which is the liquid used to elute the impurities that have been adsorbed in ion exchanger unit 200. Specifically, according to control signals from controller 700, shutoff valve 320 causes the passage of either the water to be tested from shutoff valve 310 or eluent 400 that is pumped by pump 410 and that flows through a second distribution pipe to ion exchanger unit 200. Here, the second distribution pipe is a flow path through which pump 410 pumps eluent 400 stored in a predetermined container or the like to shutoff valve 320. Shutoff valve 330 is a second valve section that controls the acquisition of water that flows through and out of ion exchanger unit 200. Specifically, in accordance with control signals from controller 700, shutoff valve 330 allows the water being tested and the eluent solution drained from ion exchanger unit 200 to pass through to a third or fourth distribution pipe. More specifically, shutoff valve 330 causes the water being tested to pass through to the third distribution pipe. Shutoff valve 330 also allows the eluent to pass through to the fourth distribution pipe. The third distribution pipe is a flow path for the water being tested to pass through flow meter 600. The fourth distribution pipe is a flow path that passes the eluent to collection container 500.

Eluent 400 is an acidic or alkaline aqueous solution that elutes impurities concentrated in ion exchanger unit 200. Examples of eluent 400 include acidic aqueous solutions such as nitric acid, hydrochloric acid, and sulfuric acid, or alkaline aqueous solutions of organic alkalis such as trimethylhydroxyammonium and tetramethylammonium hydroxide (TMAH). The concentration of metal impurities in eluent 400 is less than 100 ppt. No particular limitations apply to the dilution of eluent 400. Eluent 400 may be diluted with the water to be tested that is the object of measurement. Eluent 400 is put in a bottle or other container. Pump 410 pumps eluent 400 from the container to shutoff valve 320. The pumping of eluent 400 may be realized using gas pressure instead of pump 410.

Eluent containing impurities eluted from ion exchanger unit 200 in the elution and collection process flows through shutoff valve 330 and into collection container 500. An example of collection container 500 is a collection bottle. Collection container 500 is not limited as long as it can collect the eluent. Flow meter 600 is a flow rate acquisition unit that measures the flow rate of the water being tested that flows from shutoff valve 330 into the path for drainage. The values measured by flow meter 600 are reported to controller 700. A predetermined signal is used for this report, this signal being transmitted by flow meter 600 and received by controller 700. Flow meter 600 may also measure the flow rate of water (eluent) that passes from shutoff valve 330 to collection container 500. In other words, flow meter 600 may be installed between ion exchanger unit 200 and shutoff valve 330 to measure the flow rate of liquid from ion exchanger unit 200.

Controller 700 is the first controller that controls the opening and closing of each of shutoff valves 310, 320, and 330 based on the passage of predetermined periods of time. The determination of the passage of these predetermined periods of time can be based on whether a predetermined time period has elapsed or whether the amount of water (water being tested and eluent) measured by flow meter 600 has reached a predetermined value (threshold value).

The specific operation of controller 700 is next described. First, to implement the concentration process, controller 700 controls shutoff valve 310 such that the water to be tested from the ultrapure water production facility is passed through to shutoff valve 320. Controller 700 also controls shutoff valve 320 such that the water to be tested from shutoff valve 310 passes through to ion exchanger unit 200. Controller 700 also controls shutoff valve 330 such that the water being tested that has drained from ion exchanger unit 200 drains into the third distribution pipe. When the water being tested begins to flow during the concentration process, controller 700 determines whether the water flow rate measured by flow meter 600 has reached a preset first threshold value. Upon determining that the water flow rate measured by flow meter 600 has reached the first threshold value, controller 700 controls shutoff valve 310 such that shutoff valve 310 closes or such that water to be tested that passes from the ultrapure water production facility to the cleaning equipment is drained. Controller 700 also controls shutoff valve 320 such that eluent 400 that is pumped using pump 410 passes through to ion exchanger unit 200. Controller 700 also controls shutoff valve 330 such that the eluent that has flowed out from ion exchanger unit 200 is obtained as the first liquid, i.e., flows into the fourth distribution pipe (i.e., passes into collection container 500). In the elution and collection process, controller 700 determines whether the amount of liquid acquired (collected by collection container 500) has reached a preset second threshold value. Upon determining that the acquired water amount (collected by collection container 500) has reached the preset second threshold value, controller 700 controls shutoff valve 310 such that the water to be tested from the ultrapure water production facility passes through shutoff valve 320. Controller 700 also controls shutoff valve 320 such that the water to be tested from shutoff valve 310 passes through to ion exchanger unit 200. Controller 700 also controls shutoff valve 330 such that the water being tested that has drained from ion exchanger unit 200 drains into the third distribution pipe. Controller 700 determines whether the water flow rate measured by flow meter 600 has reached a preset third threshold during the cleaning process. Controller 700 resets flow meter 600 when the liquid water flow rate measured by flow meter 600 reaches the third threshold value. The water to be tested that flows during the cleaning process is used as cleaning liquid. This process is the same in the following description.

Figure 2:
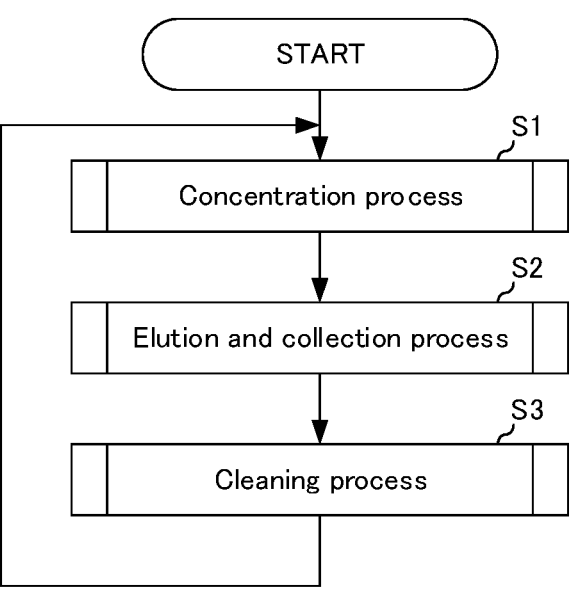
FIG. 2 is a flowchart illustrating an example of a water quality testing method in the impurity acquisition system shown in FIG. 1.

The water quality testing method in the impurity acquisition system shown in FIG. 1 is next described. FIG. 2 is a flowchart illustrating an example of the water quality testing method in the impurity acquisition system shown in FIG. 1.

Figure 3:
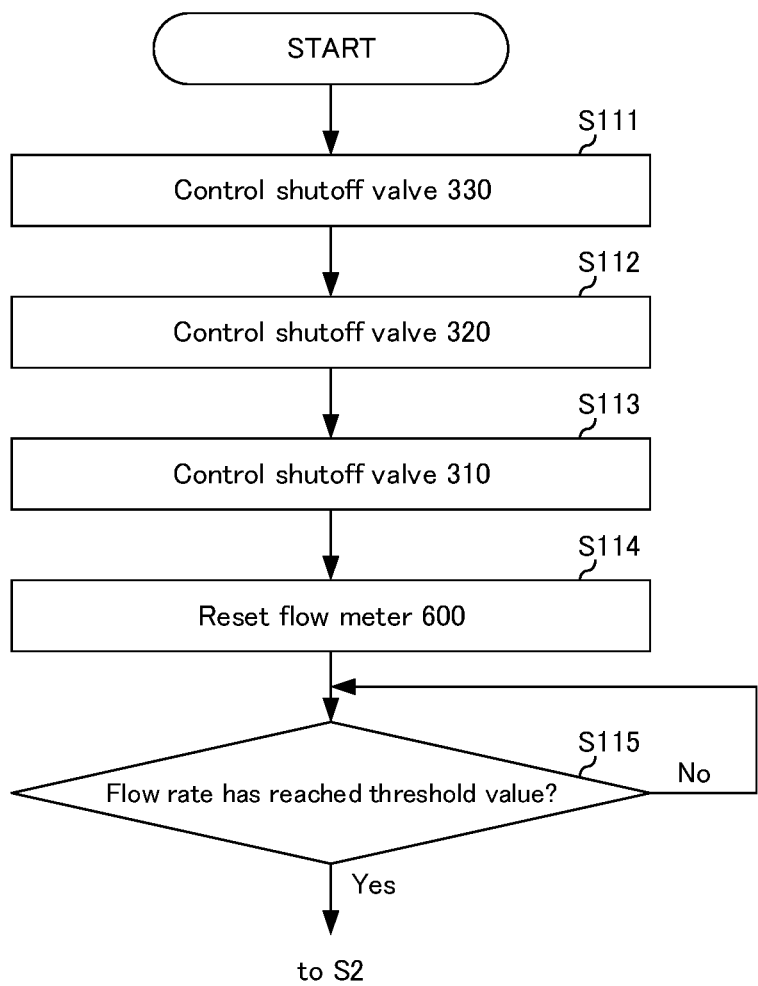
FIG. 3 is a flowchart illustrating an example of the procedures of the concentration process of Step S1 in the flowchart shown in FIG. 2.

First, the impurity acquisition system performs a concentration process (Step S1). FIG. 3 is a flowchart illustrating an example of the procedures of the concentration process of Step S1 in the flowchart shown in FIG. 2. Controller 700 controls shutoff valve 330 such that the water being tested that has drained from ion exchanger unit 200 drains into the flow path to flow meter 600 (Step S111). Controller 700 controls shutoff valve 320 such that the water to be tested from shutoff valve 310 passes through to ion exchanger unit 200 (Step S112). Controller 700 controls shutoff valve 310 such that the water to be tested from the ultrapure water production facility passes through shutoff valve 320 (Step S113). Controller 700 then resets flow meter 600 (Step S114). The inflow of water to be tested is then initiated. Controller 700 determines whether the water flow rate measured by flow meter 600 has reached the preset first threshold value (Step S115). Upon determining that the water flow rate measured by flow meter 600 has reached the first threshold, controller 700 performs Step S2. The order in which controller 700 performs Steps S111 to S113 is not limited. Controller 700 may perform Steps S111 to S113 simultaneously.

Figure 4:
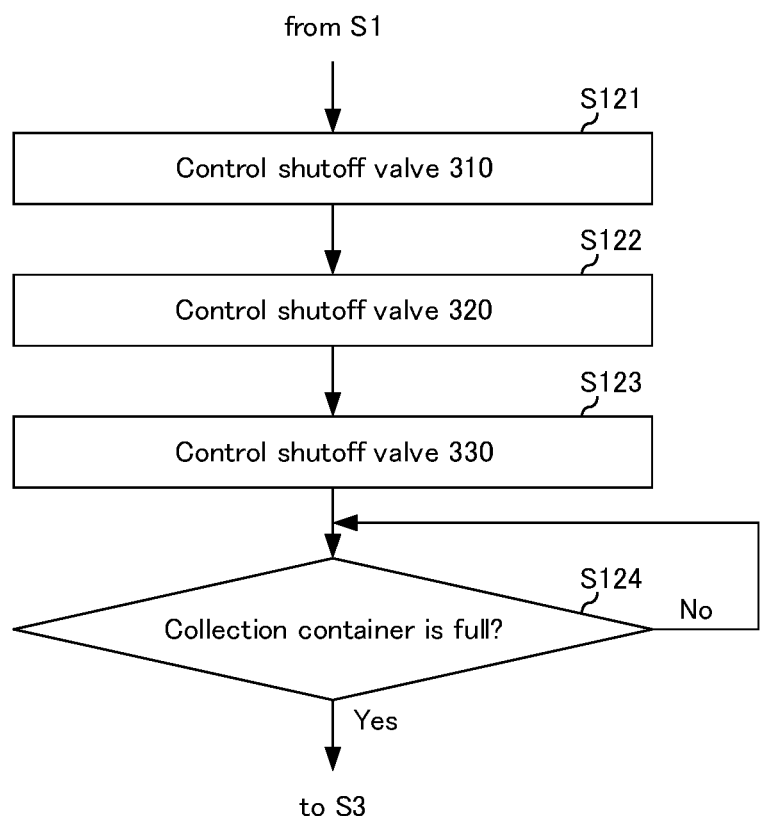
FIG. 4 is a flowchart illustrating an example of the procedures of the elution and collection process of Step S2 in the flowchart shown in FIG. 2.

The impurity acquisition system then performs an elution and collection process (Step S2). FIG. 4 is a flowchart illustrating an example of the procedures of the elution and collection process of Step S2 in the flowchart shown in FIG. 2.

Controller 700 controls shutoff valve 310 such that shutoff valve 310 closes or such that water to be tested that passes from the ultrapure water production facility to the cleaning equipment is drained (Step S121). Controller 700 controls shutoff valve 320 such that eluent 400 that has been pumped using pump 410 flows through the second distribution pipe and passes to ion exchanger unit 200 (Step S122). Controller 700 controls shutoff valve 330 such that the eluent that flows through ion exchanger unit 200 drains from ion exchanger unit 200 to collection container 500, i.e., flows to the fourth distribution pipe (Step S123). Controller 700 then determines whether the amount of water collected by collection container 500 has reached the preset second threshold (Step S124). This determination may be made, for example, by determining whether the collected eluent has filled collection container 500, by determining the weight of the entire collection container 500 in which the eluent has been collected, or by irradiating collection container 500 with a laser beam. If flow meter 600 is installed between ion exchanger unit 200 and shutoff valve 330, controller 700 may make this determination based on whether the flow rate measured by flow meter 600 has reached a preset threshold value. Upon determining that the amount of water collected by collection container 500 has reached the second threshold, controller 700 performs Step S3.

Figure 5:
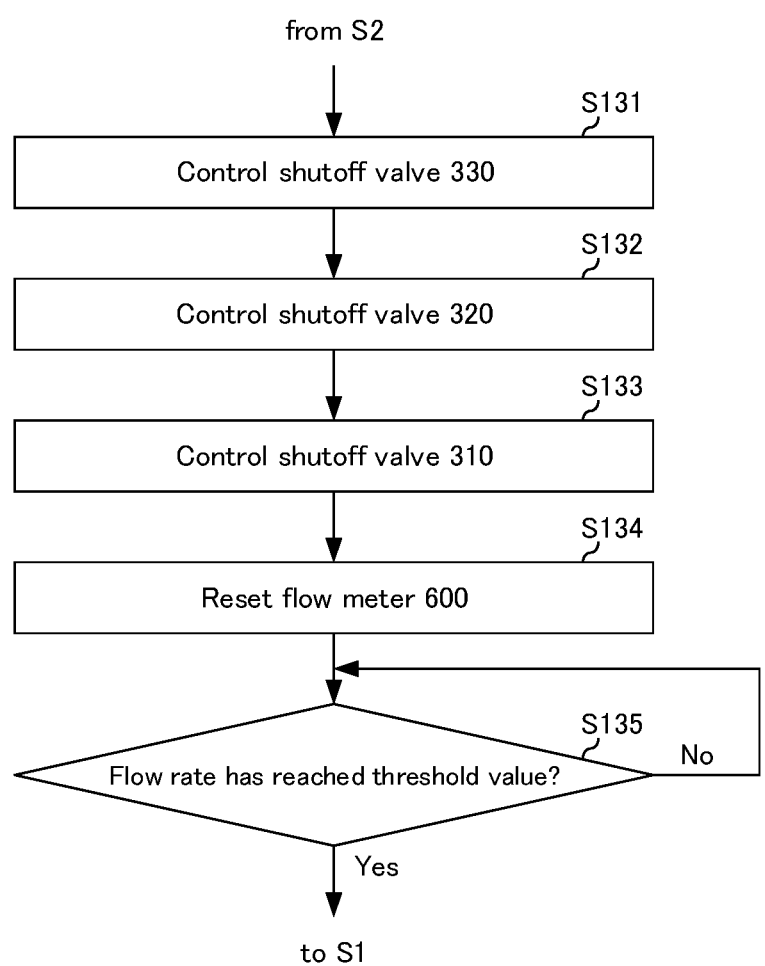
FIG. 5 is a flowchart illustrating an example of the procedures of the cleaning process of Step S3 in the flowchart shown in FIG. 2.

The impurity acquisition system then performs a cleaning process (Step S3). FIG. 5 is a flowchart illustrating an example of the procedures of the cleaning process of Step S3 in the flowchart shown in FIG. 2.

Controller 700 controls shutoff valve 330 such that the water being tested that has drained from ion exchanger unit 200 drains into the third distribution pipe (Step S131). Controller 700 controls shutoff valve 320 such that the water to be tested that flows from shutoff valve 310 passes through to ion exchanger unit 200 (Step S132). Controller 700 controls shutoff valve 310 such that the water to be tested that flows from the ultrapure water production facility passes through to shutoff valve 320 (Step S133). Controller 700 then resets flow meter 600 (Step S134). Controller 700 determines whether the water flow rate measured by flow meter 600 has reached the preset third threshold value (Step S135). Upon determining that the water flow rate measured by flow meter 600 has reached the third threshold, controller 700 performs Step S1 again. Controller 700 may reset flow meter 600 after performing Step S135 and before performing Step S1. Steps S131 to S133 are processes that do not necessarily need to be performed if each of shutoff valves 310, 320, and 330 is already in an open/closed state that allows for the passage of liquid as described above before controller 700 performs the respective processes.

Thus, in this embodiment, controlling shutoff valves installed at key points in the flow path upon the passage of each of predetermined periods of time brings about the transitions between the procedures of a concentration process in which impurities in the water to be tested are captured using ion exchanger unit 200, an elution and collection process in which the captured impurities are eluted from ion exchanger unit 200 and collected, and a cleaning process in which ion exchanger unit 200 from which the impurities have been eluted is cleaned with the water to be tested. This process allows a sample to be obtained for testing the quality of the water to be tested without removing ion exchanger unit 200 from the system. As a result, efficient testing of the quality of the water to be tested can be performed. Removing ion exchanger unit 200 from the system before the elution and collection process is performed may cause ion exchanger unit 200 to become contaminated when it is removed or when it is installed in the equipment for elution, resulting in a loss of test accuracy. In this embodiment, the elution and collection process can be performed without removing ion exchanger unit 200 from the system. Therefore, ion exchanger unit 200 will not be contaminated and the test accuracy can be maintained.

Second Embodiment

Figure 6:
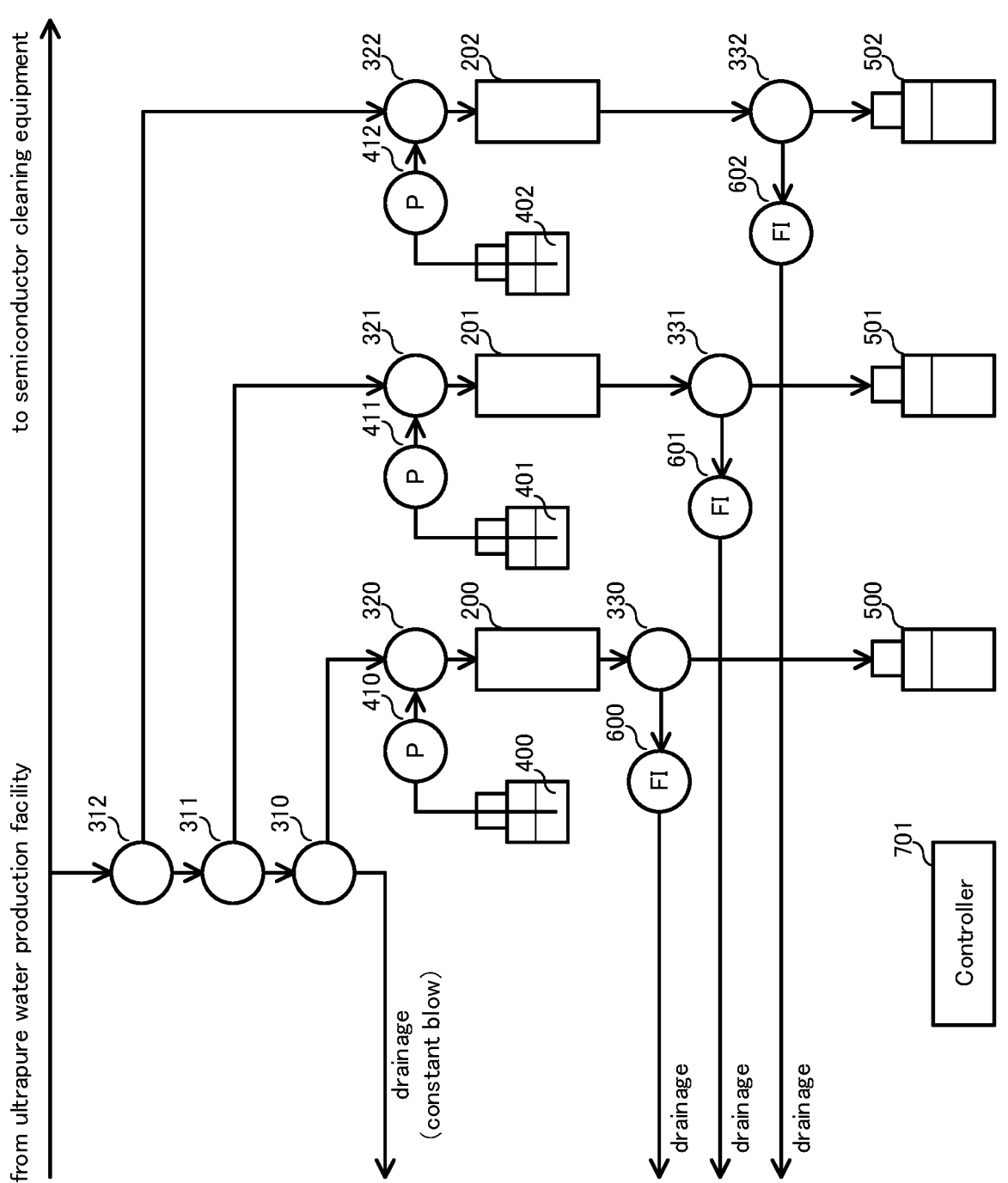
FIG. 6 is a diagram showing a second embodiment of an impurity acquisition system of the present invention.

FIG. 6 is a diagram showing a second embodiment of an impurity acquisition system of the present invention. As shown in FIG. 6, the impurity acquisition system in this embodiment has ion exchanger units 200 to 202, shutoff valves 310 to 312, 320 to 322, and 330 to 332, eluents 400 to 402, pumps 410 to 412, collection containers 500 to 502, flow meters 600 to 602, and controller 701.

Ion exchanger unit 200, shutoff valves 310, 320, and 330, eluent 400, pump 410, collection container 500, and flow meter 600 are each the same as those in the first embodiment. The second embodiment has three systems of these components in parallel. Ion exchanger units 201 and 202 each correspond to ion exchanger unit 200. Shutoff valves 311 and 312 each correspond to shutoff valve 310. Shutoff valves 321 and 322 each correspond to shutoff valve 320. Shutoff valves 331 and 332 each correspond to shutoff valve 330. Eluents 401 and 402 each correspond to eluent 400. Pumps 411 and 412 each correspond to pump 410. Collection containers 501 and 502 each correspond to collection container 500. Flow meters 601 and 602 each correspond to flow meter 600. Eluents 400 to 402 may be pumped from a single container.

Controller 701 controls shutoff valves 310 to 312, 320 to 322, and 330 to 332 in the same way as controller 700 in the first embodiment. The processing of the concentration process, elution and collection process, and cleaning process within each system is the same as in the first embodiment. In the second embodiment, controller 701 controls the timings of the concentration process, elution and collection process, and cleaning process in each system.

Figure 7:
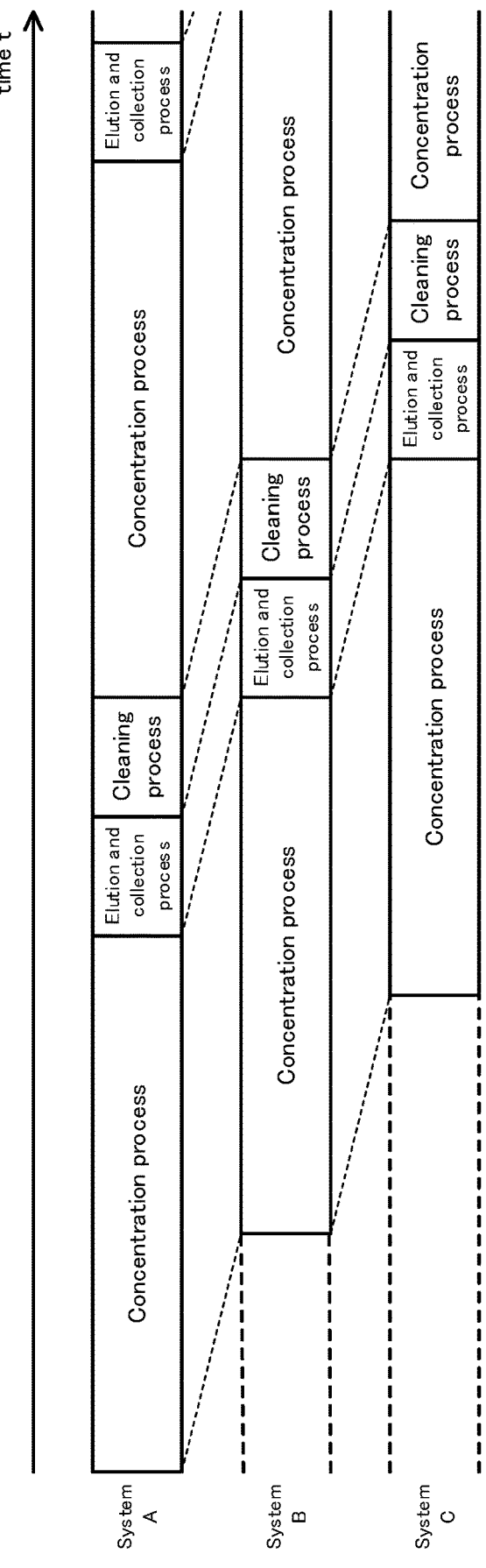
FIG. 7 is a time chart illustrating an example of the intersystem timing control performed by controller 701 shown in FIG. 6.

FIG. 7 is a time chart illustrating an example of the intersystem timing control performed by controller 701 shown in FIG. 6. In each of the system equipped with ion exchanger unit 200 (hereinafter referred to as system A), the system equipped with ion exchanger unit 201 (hereinafter referred to as system B), and the system equipped with ion exchanger unit 202 (hereinafter referred to as system C), the concentration process, elution and collection process, and cleaning process are repeated sequentially. Controller 701 controls the timing of the elution and collection process in each system such that the timing of the elution and collection process in that system does not overlap with other systems A, B, and C. Controller 701 controls shutoff valves 310 to 312 and 320 to 322 such that the liquid to be tested passes through the adsorbent in at least one of systems A, B, and C. In other words, controller 701 controls the switching of the flow of the water to be tested supplied from the ultrapure water production facility to ion exchanger units 200 to 202. In this embodiment, the explanation is based on an example of three parallel systems, but the number of systems is not limited to three.

Thus, in this embodiment, multiple systems are established in parallel, and the timing of the elution and collection process in each system is controlled so that there is no overlap among the systems. In this way, the concentration process can be performed continuously. Therefore, test results can be obtained continuously.

Third Embodiment

Figure 8:
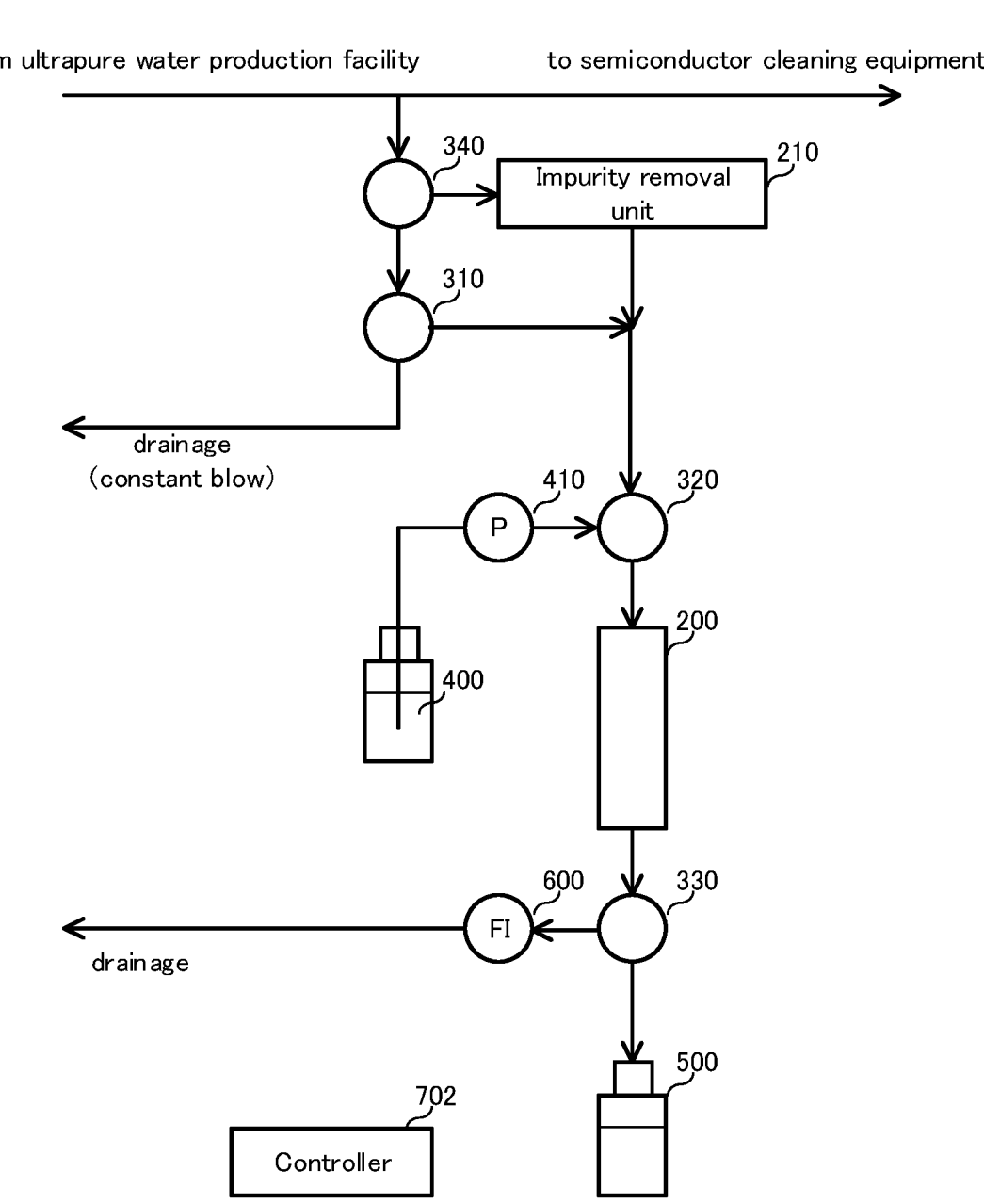
FIG. 8 is a diagram showing a third embodiment of an impurity acquisition system of the present invention.

FIG. 8 is a diagram showing a third embodiment of an impurity acquisition system of the present invention. As shown in FIG. 8, the impurity acquisition system in this embodiment has ion exchanger unit 200, impurity removal unit 210, shutoff valves 310, 320, 330, and 340, eluent 400, pump 410, collection container 500, flow meter 600, and controller 702.

Ion exchanger unit 200, shutoff valves 310, 320, and 330, eluent 400, pump 410, collection container 500, and flow meter 600 are each the same as those in the first embodiment.

Impurity removal unit 210 is a filter (impurity removal unit) used in the cleaning process. Impurity removal unit 210 has an impurity removal function (e.g., ion exchange, adsorption, and filtration). Impurity removal unit 210 removes impurities from the water to be tested by adsorbing onto a filter impurities contained in the water to be tested supplied from the ultrapure water production facility. Shutoff valve 340 is a third valve section that controls the flow to impurity removal unit 210 of water to be tested that is supplied from the ultrapure water production facility to the cleaning equipment. Specifically, according to control signals from controller 702, shutoff valve 340 causes water to be tested, which is supplied from the ultrapure water production facility to the semiconductor cleaning equipment, to flow to either the flow path to shutoff valve 310 or to a seventh distribution pipe, which is the flow path to impurity removal unit 210. Impurity removal unit 210 removes impurities from the water to be tested that flows from shutoff valve 340 and allows the impurity-free water to flow out into the flow path to shutoff valve 320. In this cleaning process, controller 702 places shutoff valve 340 in a state such that water to be tested that is supplied from the ultrapure water production facility to the cleaning equipment passes through to impurity removal unit 210.

Figure 9:
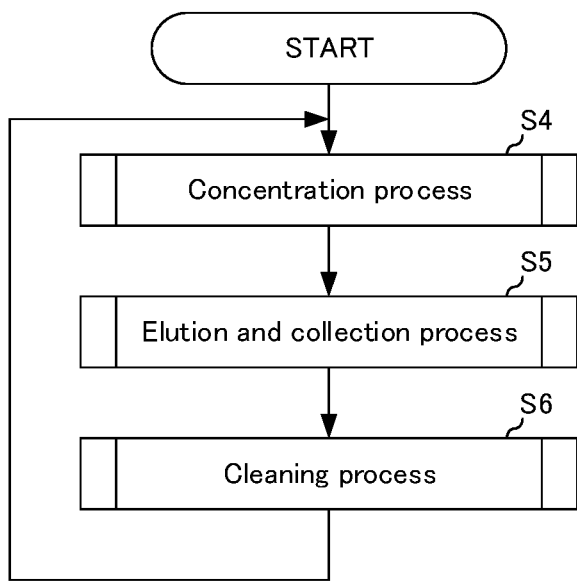
FIG. 9 is a flowchart illustrating an example of a water quality testing method in the impurity acquisition system shown in FIG. 8.

The water quality testing method in the impurity acquisition system shown in FIG. 8 is next described. FIG. 9 is a flowchart illustrating an example of a water quality testing method in the impurity acquisition system shown in FIG. 8.

Figure 10:
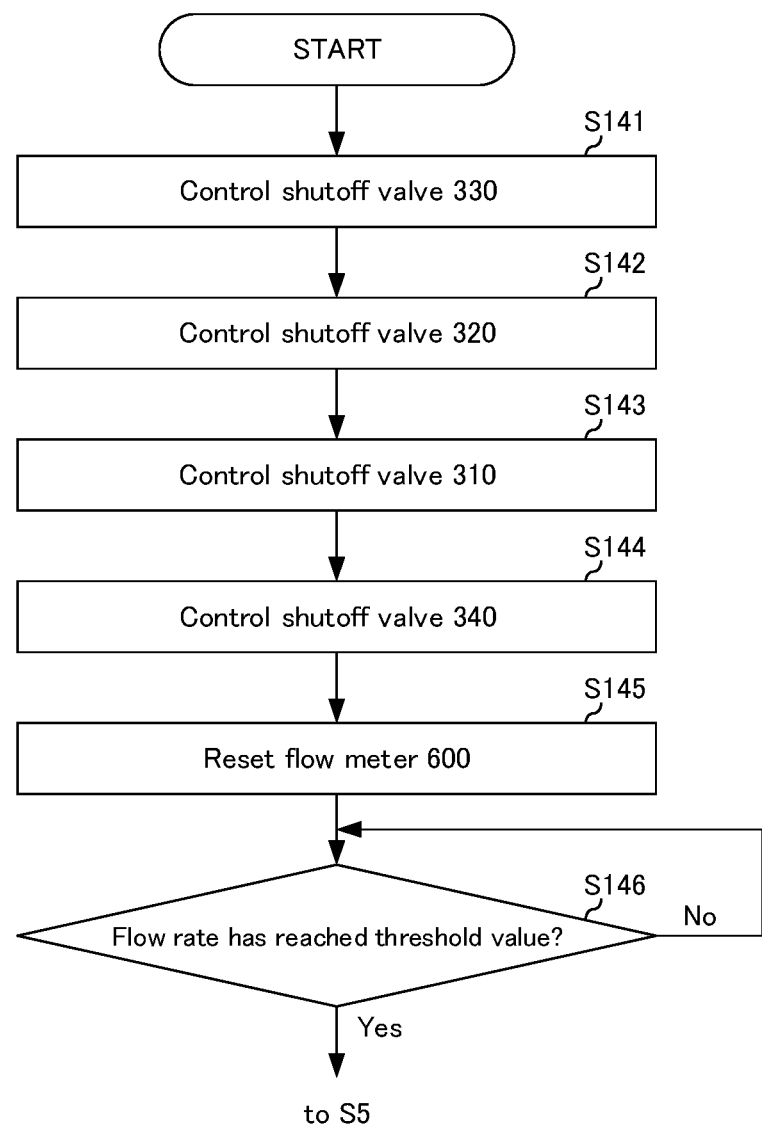
FIG. 10 is a flowchart illustrating an example of the processing of the concentration process in Step S4 in the flowchart shown in FIG. 9.
Figure 11:
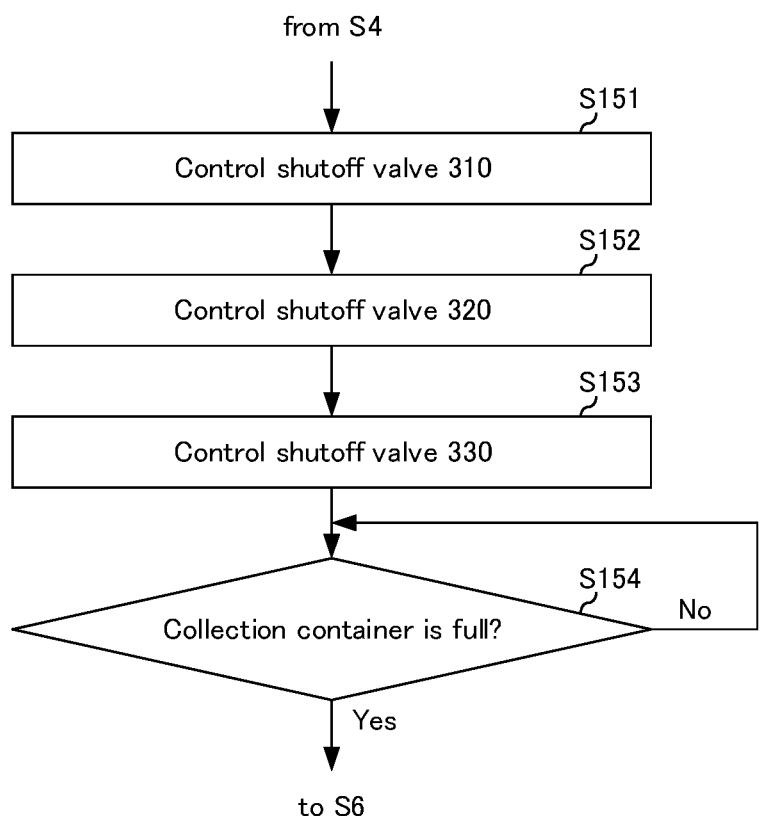
FIG. 11 is a flowchart illustrating an example of the procedures of the elution and collection process of Step S5 in the flowchart shown in FIG. 9.

First, the impurity acquisition system performs the concentration process (Step S4). FIG. 10 is a flowchart illustrating an example of the procedures of the concentration process of Step S4 in the flowchart shown in FIG. 9. Controller 702 controls shutoff valve 330 such that the water being tested that has drained from ion exchanger unit 200 drains into the third distribution pipe (Step S141). Controller 702 controls shutoff valve 320 such that the water to be tested that flows from shutoff valve 310 passes through to ion exchanger unit 200 (Step S142). Controller 702 controls shutoff valve 310 such that the water to be tested that flows from shutoff valve 340 passes through to shutoff valve 320 (Step S143). Controller 702 controls shutoff valve 340 such that the water to be tested from the ultrapure water production facility passes through shutoff valve 310 (Step S144). Controller 702 then resets flow meter 600 (Step S145). The inflow of water to be tested is then started, and controller 702 determines whether the water flow rate measured by flow meter 600 has reached the preset first threshold (Step S146). Upon determining that the water flow rate measured by flow meter 600 has reached the first threshold, controller 702 performs Step S5. No particular limitations apply to the order in which controller 702 performs Steps S141 to S144. The impurity acquisition system then performs the elution and collection process (Step S5). FIG. 11 is a flowchart illustrating an example of the procedures of the elution and collection process of Step S5 in the flowchart shown in FIG. 9.

Controller 702 controls shutoff valve 310 such that the water to be tested drains from shutoff valve 340 (Step S151). Controller 702 controls shutoff valve 320 such that eluent 400 that has been pumped using pump 410 flows through the second distribution pipe and passes to ion exchanger unit 200 (Step S152). Controller 702 controls shutoff valve 330 such that the eluent that drains from ion exchanger unit 200 flows to collection container 500, i.e., flows to the fourth distribution pipe (Step S153). Controller 702 then determines whether the amount of water collected by collection container 500 has reached the preset second threshold (Step S154). This determination process can be the same as the determination process in step S124 in the first embodiment. Upon determining that the amount of water collected by collection container 500 has reached the second threshold, controller 702 performs Step S6.

Figure 12:
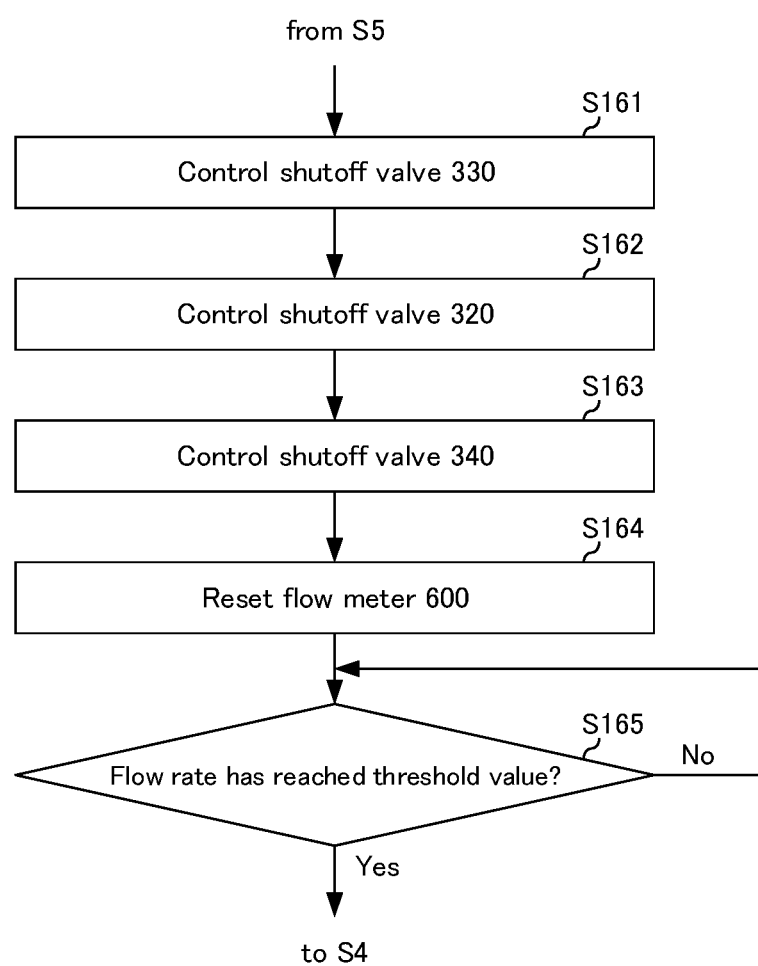
FIG. 12 is a flowchart illustrating an example of the procedures of the cleaning process of Step S6 in the flowchart shown in FIG. 9.

The impurity acquisition system then performs a cleaning process (Step S6). FIG. 12 is a flowchart illustrating an example of the procedures of the cleaning process of Step S6 in the flowchart shown in FIG. 9. Controller 702 controls shutoff valve 330 such that the water to be tested that has drained from ion exchanger unit 200 drains into the third distribution pipe (Step S161).

Controller 702 controls shutoff valve 320 such that the water to be tested that has flowed through impurity removal unit 210 passes through ion exchanger unit 200 (Step S162). Controller 702 controls shutoff valve 340 such that the water to be tested from the ultrapure water production facility passes through to impurity removal unit 210 (Step S163). Controller 702 then resets flow meter 600 (Step S164). Controller 702 determines whether the water flow rate measured by flow meter 600 has reached the preset third threshold value (Step S165). Upon determining that the water flow rate measured by flow meter 600 has reached the third threshold, controller 702 performs Step S4 again. Controller 702 may reset flow meter 600 after performing Step S165 and before performing Step S4. Steps S161 to S163 are processes that do not necessarily need to be performed if each of shutoff valves 320, 330, and 340 is already in an open/closed state that can pass liquid as described above before controller 702 performs the respective processes.

Thus, in this embodiment, controlling the shutoff valves installed at key points in the flow path upon the passage of predetermined periods of time brings about the transitions between the procedures of a concentration process in which impurities in the water being tested are captured using ion exchanger unit 200, an elution and collection process in which the captured impurities are eluted from ion exchanger unit 200 and collected, and a cleaning process in which ion exchanger unit 200 from which the impurities have been eluted is cleaned with the water to be tested. This allows a sample to be obtained for testing the quality of the water being tested without removing ion exchanger unit 200 from the system. As a result, efficient testing of the quality of the water being tested can be performed. In addition, the provision of impurity removal unit 210 allows impurities to be removed from the water to be tested that is then used for cleaning in the cleaning process. This process reduces the concentration of impurities in the water to be tested that is used for cleaning.

Fourth Embodiment

Figure 13:
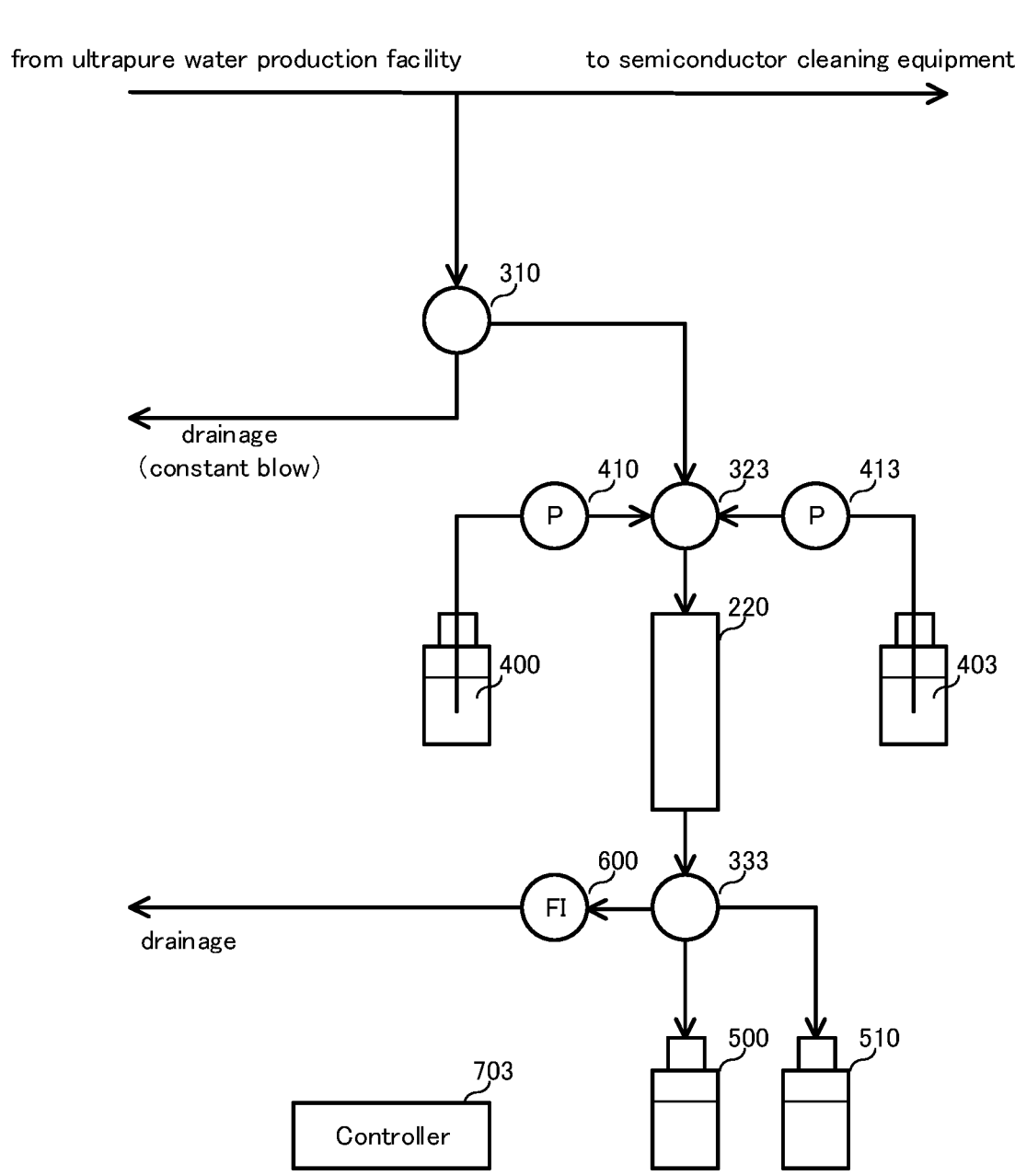
FIG. 13 is a diagram showing a fourth embodiment of an impurity acquisition system of the present invention.

FIG. 13 is a diagram showing a fourth embodiment of an impurity acquisition system of the present invention. As shown in FIG. 13, the impurity acquisition system in this embodiment has ion exchanger unit 220, shutoff valves 310, 323, and 333, eluent 400, regeneration liquid 403, pumps 410 and 413, collection containers 500 and 510, flow meter 600, and controller 703.

Shutoff valve 310, eluent 400, pump 410, collection container 500, and flow meter 600 are each the same as in the first embodiment.

Ion exchanger unit 220 is a unit that removes impurities from the water being tested from ultrapure water production facilities. Ion exchanger unit 220 has an ion removal or ion adsorption function (e.g., ion adsorption membrane or monolithic organic porous, ion exchange resin). The objects removed or adsorbed by ion exchanger unit 220 are metallic impurities. Ion exchanger unit 220 also adsorbs particulates through an electrostatic effect. In this embodiment, the functional group of ion exchanger unit 220 is a cation or anion exchange group or a chelate compound.

Regeneration liquid 403 is an acidic or alkaline liquid used to regenerate ion exchanger unit 220 in a regeneration process performed after eluting and cleaning impurities concentrated in ion exchanger unit 220. Regeneration liquid 403 is held in a bottle or other container. Pump 413 pumps regeneration liquid 403 from the container and sends it through a fifth distribution pipe to shutoff valve 323. Here, the fifth distribution pipe is a flow path by which pump 413 causes regeneration liquid 403 that is stored in a predetermined container to flow to shutoff valve 323. Gas pressure pumping may be used instead of pump 413 to pump regeneration liquid 403. The concentration of metal impurities in regeneration liquid 403 is less than 100 ppt.

Collection container 510 is a container into which water (regeneration effluent) that has drained from ion exchanger unit 220 in the regeneration process flows by way of shutoff valve 333. Shutoff valve 333 and collection container 510 are disposed by way of a sixth distribution pipe. Flow meter 600 may also measure the flow rate of water that passes from shutoff valve 333 to collection container 510.

Shutoff valve 323 is the first valve section that controls the flow of water to be tested through shutoff valve 310, eluent 400 pumped by pump 410 that flows through the second distribution pipe, or regeneration liquid 403 pumped by pump 413 that flows through the fifth distribution pipe to ion exchanger unit 220. Specifically, in accordance with control signals from controller 703, shutoff valve 323 allows water to be tested to flow through shutoff valve 310, eluent 400 pumped up by pump 410 to flow through the second distribution pipe, or regeneration liquid 403 pumped up by pump 413 to flow through the fifth distribution pipe, and then to pass through ion exchanger unit 220. Shutoff valve 333 is a second valve section that controls the acquisition of water that flows through and out of ion exchanger unit 220. Specifically, according to control signals from controller 703, shutoff valve 333 causes, of the liquids that have passed through ion exchanger unit 220, water being tested to flow to the third distribution pipe, eluent to flow to the fourth distribution pipe, and regeneration effluent to flow to the sixth distribution pipe.

Controller 703 is the first controller that controls the opening and closing of each of shutoff valves 310, 323, and 333 based on the passage of predetermined periods of time. The determination of the passage of these predetermined periods of time can be based on whether a predetermined time period has elapsed or whether the amount of water (water to be tested, eluent, or regeneration effluent) measured by flow meter 600 has reached a predetermined value (threshold value).

The specific operation of controller 703 is next described. First, to perform the concentration process, controller 703 controls shutoff valve 310 such that the water to be tested supplied from the ultrapure water production facility to the cleaning equipment passes through to ion exchanger unit 220. Controller 703 controls shutoff valve 323 such that the water to be tested that has passed through shutoff valve 310 passes through to ion exchanger unit 220. Controller 703 controls shutoff valve 333 such that the water being tested that has drained from ion exchanger unit 220 drains through the third distribution pipe. In this state of the concentration process, the inflow of water being tested is initiated. Controller 703 determines whether the water flow rate measured by flow meter 600 has reached the preset first threshold value. Upon determining that the water flow rate measured by flow meter 600 has reached the first threshold value, controller 703 effects control such that shutoff valve 310 closes or such that the water to be tested that is supplied from the ultrapure water production facility to the cleaning device drains out. Controller 703 controls shutoff valve 323 such that eluent 400 that has been pumped using pump 410 flows through the second distribution pipe and passes on to ion exchanger unit 220. Controller 703 also controls shutoff valve 333 such that the eluent that has flowed through ion exchanger unit 220 is acquired as the first liquid, i.e., flows into the fourth distribution pipe (i.e., such that the eluent passes into collection container 500). In the elution and collection process, controller 703 determines whether the amount of water acquired (collected by collection container 500) has reached the preset second threshold value. Upon determining that the amount of acquired water (collected by collection container 500) has reached the preset second threshold value, controller 703 controls shutoff valve 310 such that the water to be tested from the ultrapure water production facility passes through shutoff valve 323. Controller 703 also controls shutoff valve 323 such that the water to be tested from shutoff valve 310 passes through to ion exchanger unit 220. Controller 703 also controls shutoff valve 333 such that the water being tested that has drained from ion exchanger unit 220 drains through the third distribution pipe. Controller 703 determines whether the water flow rate measured by flow meter 600 in the first cleaning process has reached the preset third threshold value. Upon determining that the water flow rate measured by flow meter 600 has reached the third threshold in the first cleaning process, controller 703 effects control such that shutoff valve 310 closes or such that the water being tested that is supplied from the ultrapure water production facility to the cleaning equipment drains. Controller 703 controls shutoff valve 323 such that the regeneration liquid 403 that has been pumped using pump 413 flows through the fifth distribution pipe and passes through to ion exchanger unit 220. Controller 703 also controls shutoff valve 333 such that the regeneration effluent fluid that drains from ion exchanger unit 220 is obtained as a second liquid (to be passed through to collection container 510), i.e., flows into the sixth distribution pipe. Controller 703 determines whether the amount of water acquired in the regeneration process (collected by collection container 510) has reached the fourth threshold value. Upon determining that the amount of water acquired in the regeneration process (collected by collection container 510) has reached the fourth threshold value, controller 703 controls shutoff valve 310 such that the water to be tested, which is supplied from the ultrapure water production facility to the cleaning equipment, passes through to ion exchanger unit 220. Controller 703 controls shutoff valve 323 such that the water to be tested that has flowed through shutoff valve 310 passes through to ion exchanger unit 220. Controller 703 controls shutoff valve 333 such that the water being tested that has drained from ion exchanger unit 220 drains through the third distribution pipe. Controller 703 determines whether the water flow rate measured by flow meter 600 in the second cleaning process has reached the preset fifth threshold value. Upon determining that the water flow rate measured by flow meter 600 has reached the fifth threshold in the second cleaning process, controller 703 resets flow meter 600.

Figure 14:
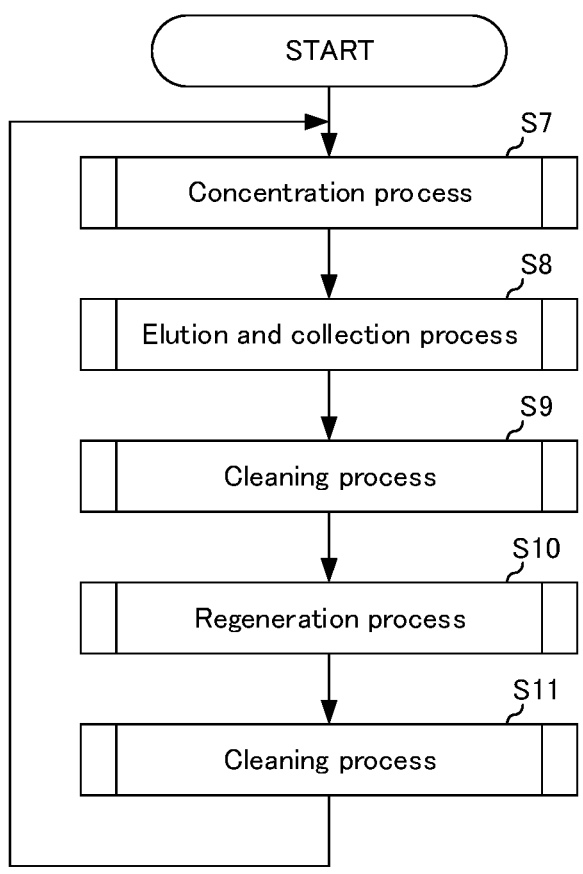
FIG. 14 is a flowchart illustrating an example of a water quality testing method in the impurity acquisition system shown in FIG. 13.

The water quality testing method in the impurity acquisition system shown in FIG. 13 is next described. FIG. 14 is a flowchart illustrating an example of a water quality testing method in the impurity acquisition system shown in FIG. 13.

Figure 15:
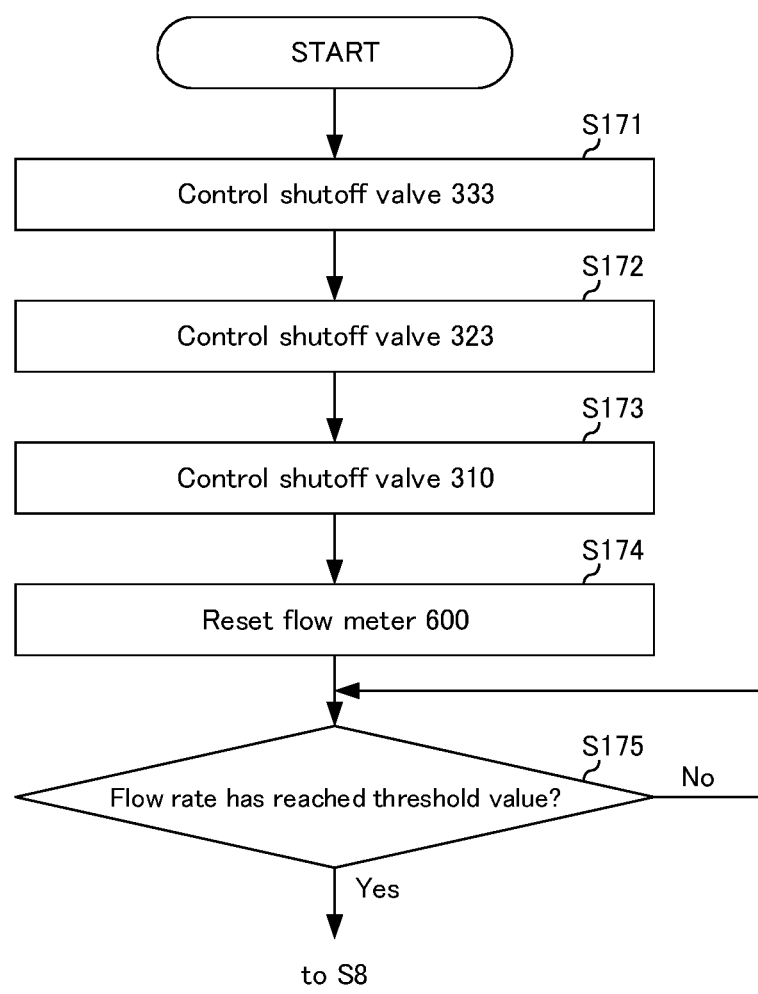
FIG. 15 is a flowchart illustrating an example of the procedures of the concentration process of Step S7 in the flowchart shown in FIG. 14.

First, the impurity acquisition system performs the concentration process (Step S7). FIG. 15 is a flowchart illustrating an example of the procedures of the concentration process of Step S7 in the flowchart shown in FIG. 14. Controller 703 controls shutoff valve 333 such that the water being tested that has passed through ion exchanger unit 220 drains through the third distribution pipe (Step S171). Controller 703 controls shutoff valve 323 such that the water being tested from shutoff valve 310 passes through to ion exchanger unit 220 (Step S172). Controller 703 controls shutoff valve 310 such that water to be tested from the ultrapure water production facility passes through shutoff valve 323 (Step S173). Controller 703 then resets flow meter 600 (Step S174). The inflow of water being tested is then started, and controller 703 determines whether the water flow rate measured by flow meter 600 has reached the preset first threshold value (Step S175). Upon determining that the water flow rate measured by flow meter 600 has reached the first threshold, controller 703 performs Step S8. The order in which controller 703 performs Steps S171 to S173 is not limited.

Figure 16:
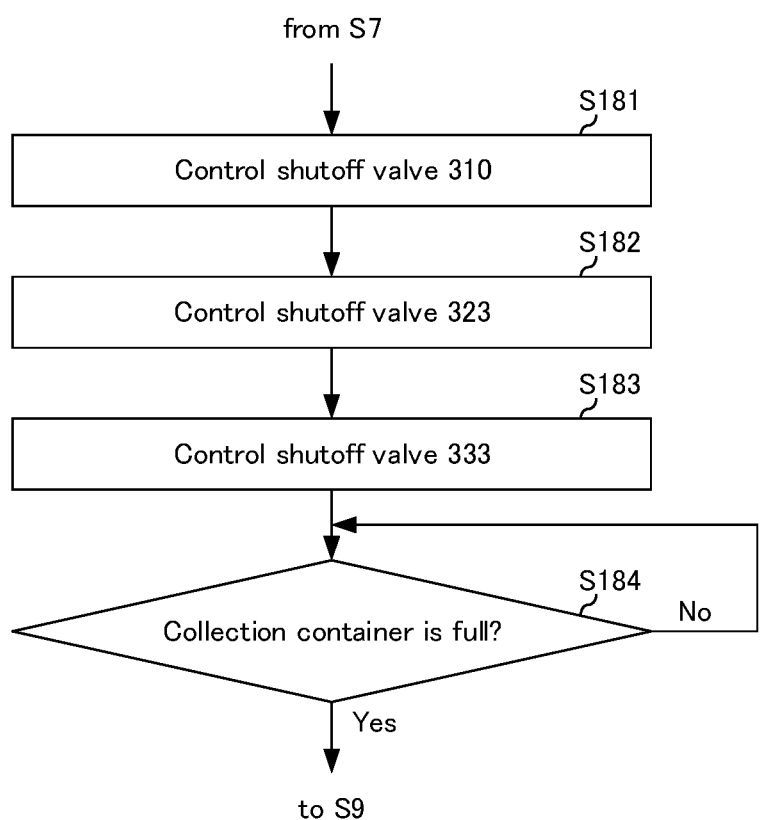
FIG. 16 is a flowchart illustrating an example of the procedures of the elution and collection process of Step S8 in the flowchart shown in FIG. 14.

The impurity acquisition system then performs the elution and collection process (Step S8). FIG. 16 is a flowchart illustrating an example of the procedures of the elution and collection process of Step S8 in the flowchart shown in FIG. 14.

Controller 703 effects control such that shutoff valve 310 closes or such that the water to be tested, which is supplied from the ultrapure water production facility to the cleaning equipment, flows through the third distribution pipe (Step S181). Controller 703 controls shutoff valve 323 such that eluent 400 that has been pumped using pump 410 and that flows through the second distribution pipe passes to ion exchanger unit 220 (Step S182). Controller 703 controls shutoff valve 333 such that the eluent that flows through ion exchanger unit 220 drains to collection container 500, i. e., flows through the fourth distribution pipe (Step S183). Controller 703 then determines whether the amount of water collected by collection container 500 has reached the preset second threshold (Step S184). This determination process can be the same as the determination process in Step S124 in the first embodiment. Upon determining that the amount of water collected by collection container 500 has reached the second threshold, controller 703 performs Step S9.

Figure 17:
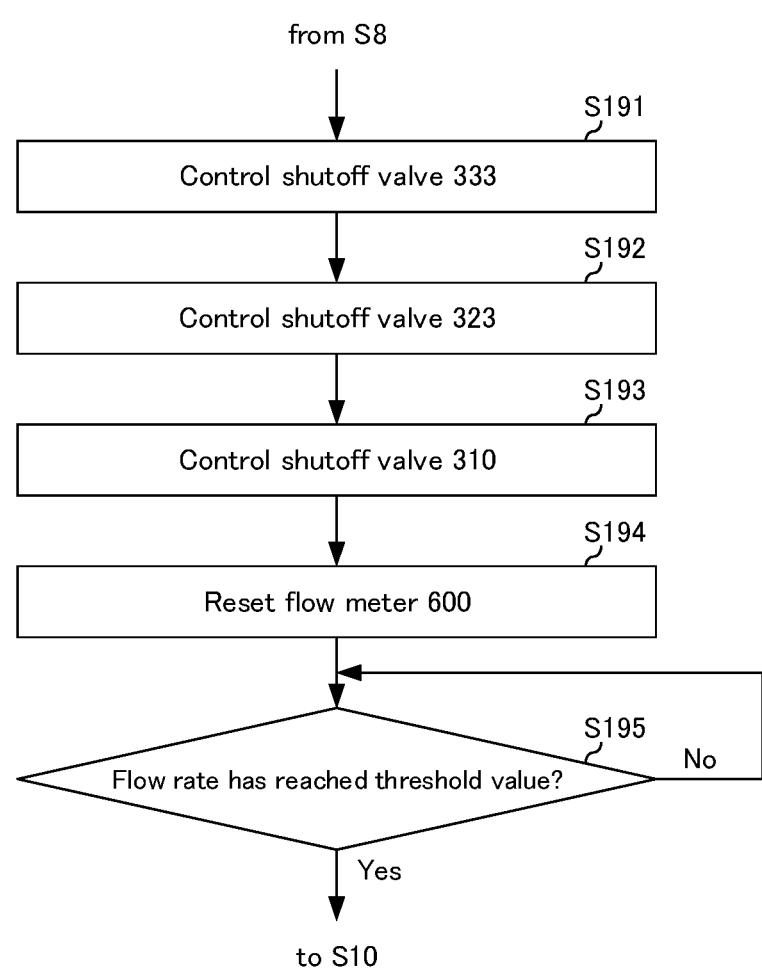
FIG. 17 is a flowchart illustrating an example of the procedures of the first cleaning process of Step S9 in the flowchart shown in FIG. 14.

The impurity acquisition system then performs a cleaning process (first cleaning process) (Step S9). FIG. 17 is a flowchart illustrating an example of the procedures of the first cleaning process of Step S9 in the flowchart shown in FIG. 14.

Controller 703 controls shutoff valve 333 such that the water to be tested that has flowed through ion exchanger unit 220 drains through the third distribution pipe (Step S191). Controller 703 controls shutoff valve 323 such that the water to be tested from shutoff valve 310 passes through to ion exchanger unit 220 (Step S192). Controller 703 controls shutoff valve 310 such that the water to be tested from the ultrapure water production facility passes through to shutoff valve 323 (Step S193). Controller 703 then resets flow meter 600 (Step S194). Controller 703 determines whether the water flow rate measured by flow meter 600 has reached the preset third threshold value (Step S195). Upon determining that the water flow rate measured by flow meter 600 has reached the third threshold, controller 703 performs Step S10.

Figure 18:
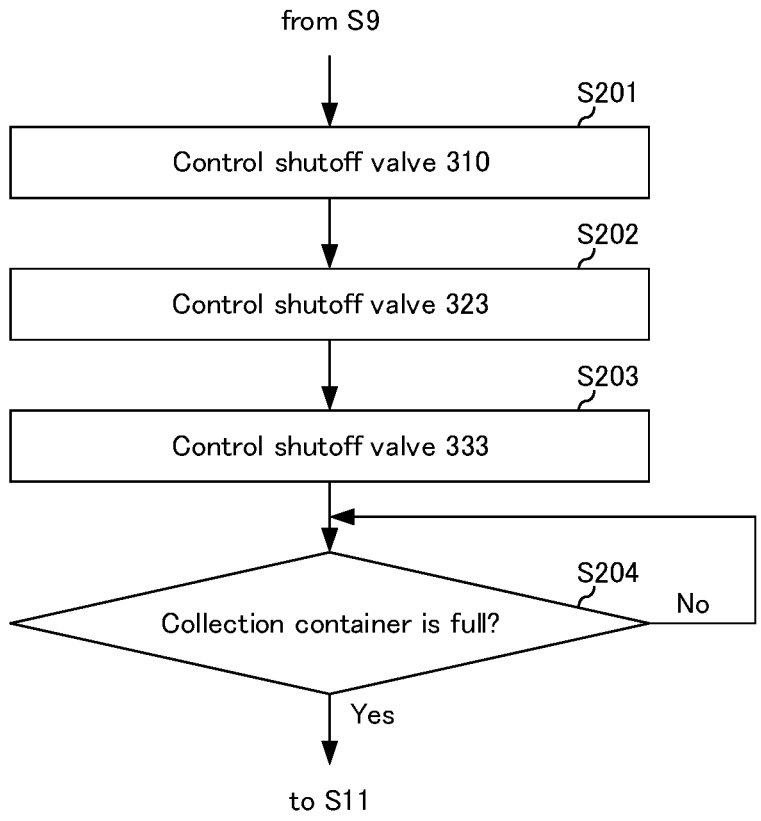
FIG. 18 is a flowchart illustrating an example of the procedures of the regeneration process in Step S10 in the flowchart shown in FIG. 14.

The impurity acquisition system then performs the regeneration process (Step S10). In this embodiment, it is necessary to regenerate ion exchanger unit 220 to restore the ionic form of the functional groups of ion exchanger unit 220 to the standard form. FIG. 18 is a flowchart illustrating an example of the procedures of the regeneration process of Step S10 in the flowchart shown in FIG. 14.

First, controller 703 controls shutoff valve 310 such that the water to be tested, which is supplied from the ultrapure water production facility to the cleaning equipment, flows through the third distribution pipe (Step S201). Controller 703 controls shutoff valve 323 such that regeneration liquid 403 that has been pumped using pump 413 flows through the fifth distribution pipe and passes through to ion exchanger unit 220 (Step S202). Controller 703 controls shutoff valve 333 such that the alkali effluent that has flowed through ion exchanger unit 220 flows to collection container 510, i.e., through the sixth distribution pipe (Step S203). Controller 703 then determines whether the amount of water collected by collection container 510 has reached the preset fourth threshold value (Step S204). This determination may be made, for example, by judging whether the collected regeneration liquid has filled collection container 510, by judging based on the weight of the entire collection container 510 in which the alkali effluent was collected, or by irradiating collection container 510 with a laser beam. Upon determining that the amount of water collected by collection container 510 has reached the fourth threshold, controller 703 performs Step S11.

Figure 19:
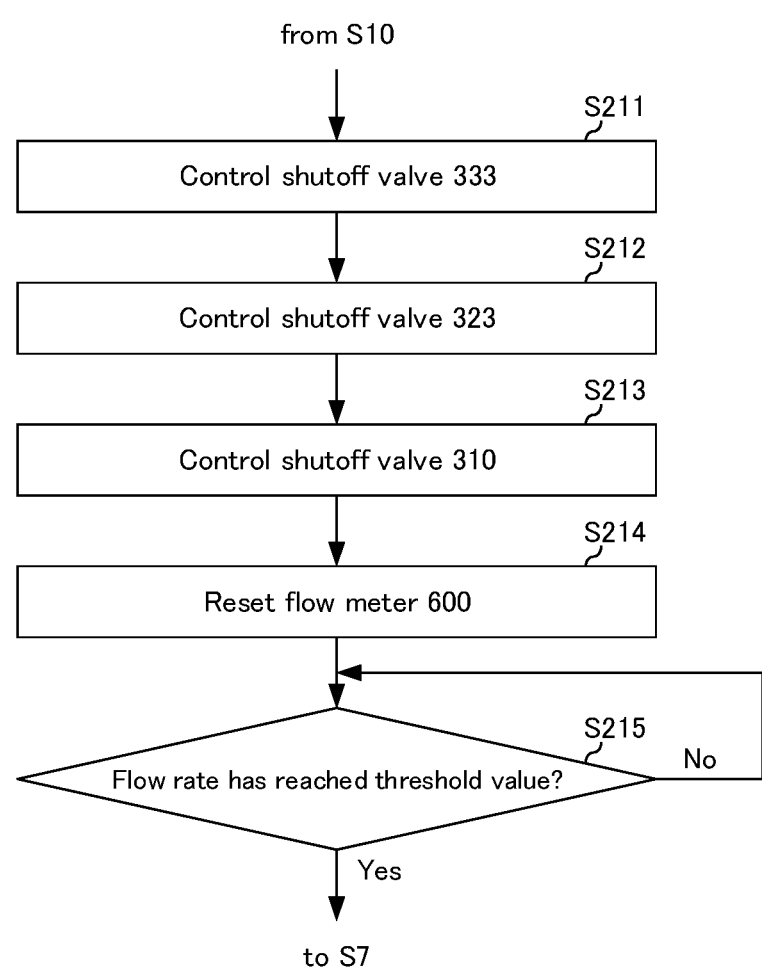
FIG. 19 is a flowchart illustrating an example of the procedures of the second cleaning process of Step S11 in the flowchart shown in FIG. 14.

The impurity acquisition system then performs a cleaning process (second cleaning process) (Step S11). FIG. 19 is a flowchart illustrating an example of the procedures of the second cleaning process of Step S11 in the flowchart shown in FIG. 14.

Controller 703 controls shutoff valve 333 such that water to be tested that has flowed through ion exchanger unit 220 drains through the third distribution pipe (Step S211). Controller 703 controls shutoff valve 323 such that the water to be tested from shutoff valve 310 passes through to ion exchanger unit 220 (Step S212). Controller 703 controls shutoff valve 310 such that the water to be tested from the ultrapure water production facility passes through to shutoff valve 323 (Step S213). Controller 703 then resets flow meter 600 (Step S214). Controller 703 determines whether the water flow rate measured by flow meter 600 has reached the preset fifth threshold value (Step S215). Upon determining that the water flow rate measured by flow meter 600 has reached the fifth threshold, controller 703 performs Step S7 again. Controller 703 may reset flow meter 600 after performing Step S215 and before performing Step S7. Steps S211 to S213 are processes that do not necessarily need to be performed if each of shutoff valves 310, 323, and 333 is already in an open/closed state that is capable of passing liquid as described above before controller 703 performs the respective processes.

Thus, in this embodiment, controlling the shutoff valves installed at key points in the flow path upon the passage of predetermined periods of time effects the transitions between processes that include a concentration process in which impurities in the water being tested are captured using ion exchanger unit 220, an elution and collection process in which the captured impurities are eluted from ion exchanger unit 220 and collected, a first cleaning process in which ion exchanger unit 220 from which the impurities have been eluted is cleaned with water to be tested, a regeneration process in which ion exchanger unit 220 is regenerated with acidic or alkaline liquid, and a second cleaning process in which ion exchanger unit 220 is further cleaned. This allows a sample to be obtained for testing the quality of the water being tested without removing ion exchanger unit 220 from the system. As a result, efficient testing of the quality of the water being tested can be performed. As in the second embodiment, multiple systems may also be provided for the anion exchange groups used in this embodiment.

Fifth Embodiment

Figure 20:
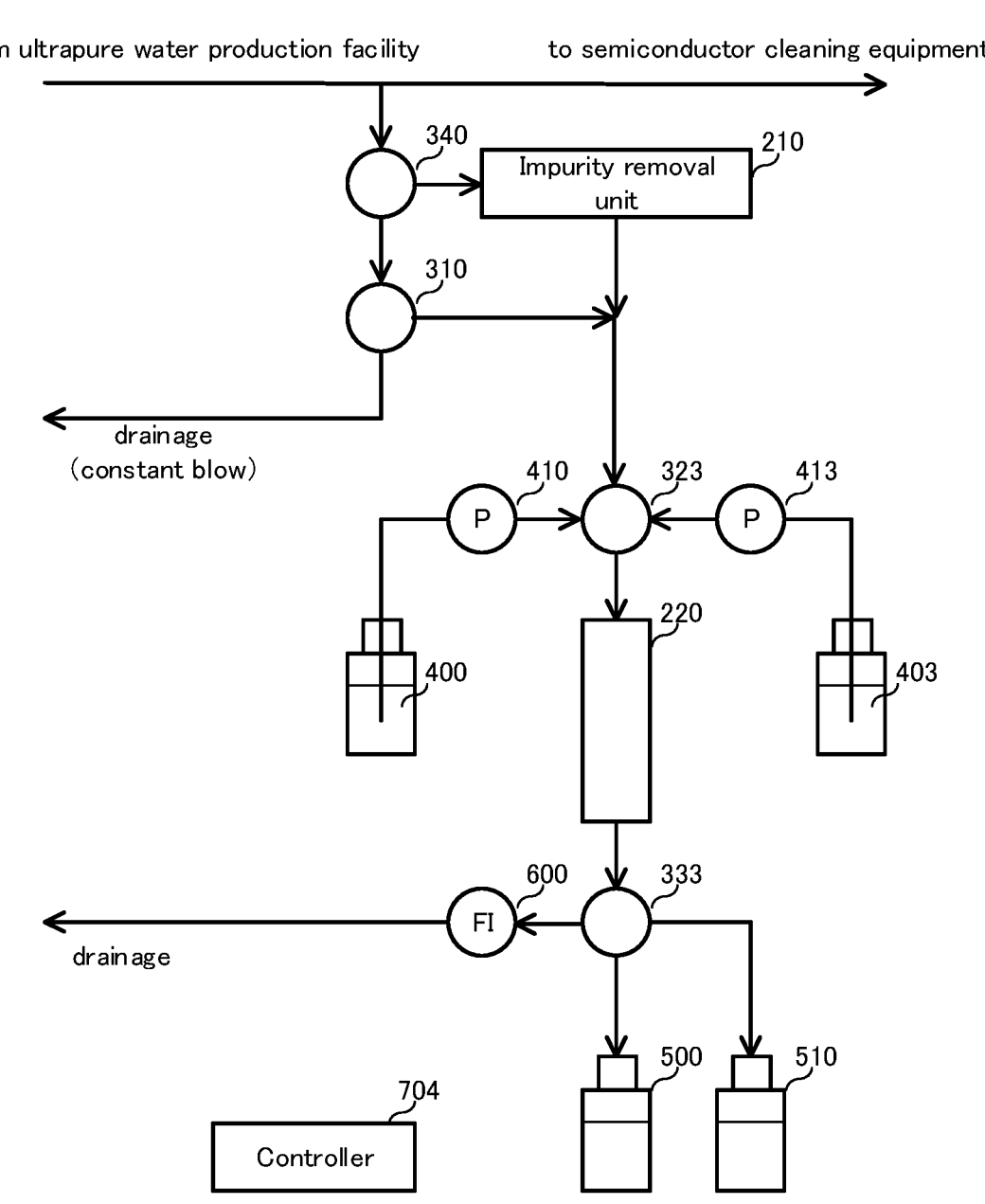
FIG. 20 is a diagram showing a fifth embodiment of an impurity acquisition system of the present invention.

FIG. 20 is a diagram showing a fifth embodiment of an impurity acquisition system of the present invention. As shown in FIG. 20, the impurity acquisition system in this embodiment has impurity removal unit 210, ion exchanger unit 220, shutoff valves 310, 323, 333, and 340, eluent 400, regeneration liquid 403, pumps 410 and 413, collection containers 500 and 510, flow meter 600, and controller 704.

Shutoff valve 310, eluent 400, pump 410, collection container 500, and flow meter 600 are each the same as in the first embodiment. Impurity removal unit 210 and shutoff valve 340 are each the same as in the third embodiment. Ion exchanger unit 220, shutoff valves 323 and 333, regeneration liquid 403, pump 413, and collection container 510 are each the same as in the fourth embodiment. Here, shutoff valve 323 can switch between water to be tested that has passed through impurity removal unit 210, water to be tested that has not passed through impurity removal unit 210, eluent 400 that has been pumped by pump 410 and flows through the second distribution pipe, and regeneration liquid 403 that has been pumped by pump 413 and flows through the fifth distribution pipe, and shutoff valve 323 can thus control the flow of any of these liquids to ion exchanger unit 220.

Controller 704 is a first controller that controls the opening and closing of each of shutoff valves 310, 323, 333, and 340 based on the passage of predetermined periods of time. The determination of the passage of these predetermined periods of time can be based on whether a predetermined time period has elapsed, or whether the amount of liquid (water to be tested, eluent, or regeneration effluent) measured by flow meter 600 has reached a predetermined value (threshold value). Controller 704 has the functions of controller 702 in the third embodiment and controller 703 in the fourth embodiment.

Figure 21:
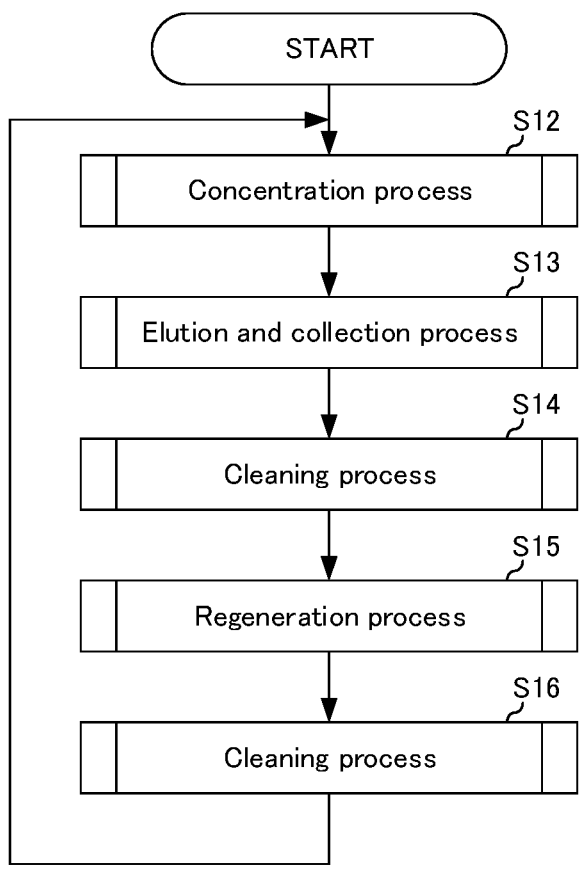
FIG. 21 is a flowchart illustrating an example of a water quality testing method in the impurity acquisition system shown in FIG. 20.

The water quality testing method in the impurity acquisition system shown in FIG. 20 is next described. FIG. 21 is a flowchart illustrating an example of a water quality testing method in the impurity acquisition system shown in FIG. 20.

Figure 22:
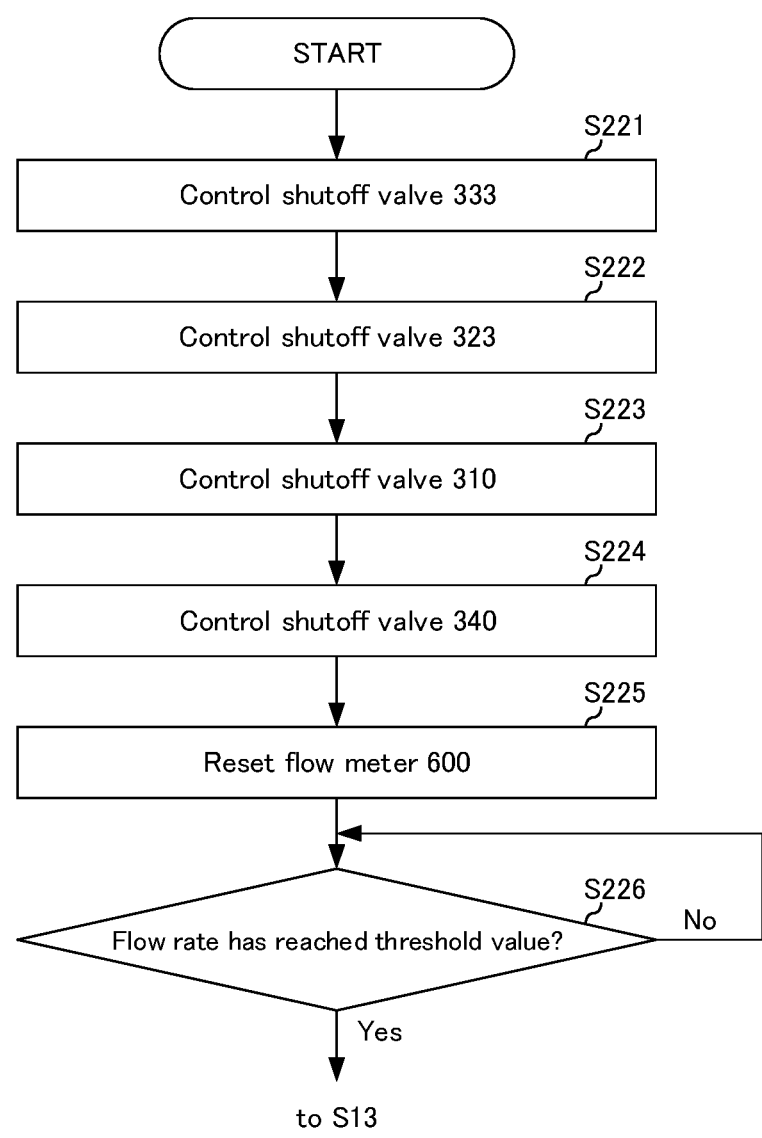
FIG. 22 is a flowchart illustrating an example of the procedures of the concentration process of Step S12 in the flowchart shown in FIG. 21.

First, the impurity acquisition system performs the concentration process (Step S12). FIG. 22 is a flowchart illustrating an example of the procedures of the concentration process of Step S12 in the flowchart shown in FIG. 21. Controller 704 controls shutoff valve 333 such that water being tested that has flowed through ion exchanger unit 220 drains through the third distribution pipe (Step S221). Controller 704 controls shutoff valve 323 such that water to be tested from shutoff valve 310 passes through to ion exchanger unit 220 (Step S222). Controller 704 controls shutoff valve 310 such that water to be tested from shutoff valve 340 passes through to shutoff valve 323 (Step S223). Controller 704 controls shutoff valve 340 such that water to be tested from the ultrapure water production facility passes through to shutoff valve 310 (Step S224). Controller 704 then resets flow meter 600 (Step S225). The inflow of water to be tested is then started. Controller 704 determines whether the water flow rate measured by flow meter 600 has reached the preset first threshold value (Step S226). Upon determining that the water flow rate measured by flow meter 600 has reached the first threshold, controller 704 performs Step S13. The order in which controller 704 performs Steps S221 to S224 is not limited.

Figure 23:
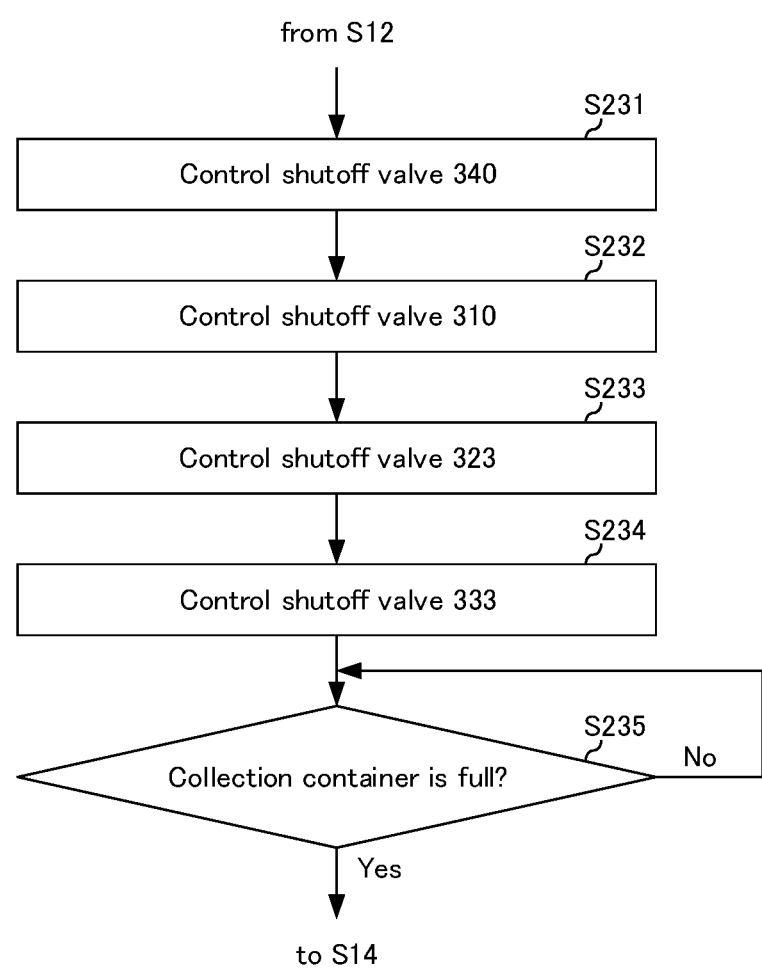
FIG. 23 is a flowchart illustrating an example of the procedures of the elution and collection process of Step S13 in the flowchart shown in FIG. 21.

The impurity acquisition system then performs an elution and collection process (Step S13). FIG. 23 is a flowchart illustrating an example of the procedures of the elution and collection process of Step S13 in the flowchart shown in FIG. 21.

Controller 704 effects control such that shutoff valve 340 closes or such that the water to be tested, which is supplied from the ultrapure water production facility to the cleaning equipment, passes to shutoff valve 310 (Step S231). When controlling shutoff valve 340 such that the water to be tested that is supplied from the ultrapure water production facility to the cleaning equipment passes through shutoff valve 310, controller 704 also controls shutoff valve 310 such that the water to be tested from shutoff valve 340 flows through (Step S232). Controller 704 controls shutoff valve 323 such that eluent 400 that has been pumped using pump 410 flows through the second distribution pipe and passes to ion exchanger unit 220 (Step S233). Controller 704 controls shutoff valve 333 such that the eluent flows through ion exchanger unit 220 to collection container 500, i. e., to the fourth distribution pipe (Step S234). Controller 704 then determines whether the amount of water collected by collection container 500 has reached the preset second threshold (Step S235). This determination process can be the same as the determination process in Step S124 in the first embodiment. Upon determining that the amount of water collected by collection container 500 has reached the second threshold, controller 704 performs Step S14.

Figure 24:
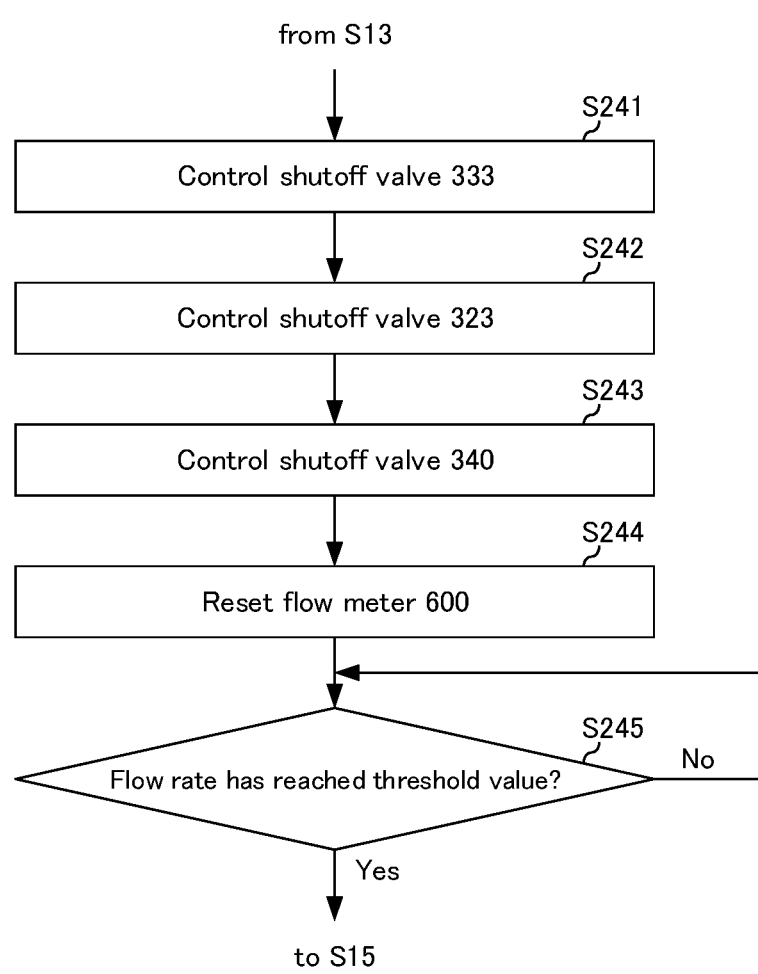
FIG. 24 is a flowchart illustrating an example of the procedures of the first cleaning process of Step S14 in the flowchart shown in FIG. 21.

The impurity acquisition system then performs a cleaning process (first cleaning process) (Step S14). FIG. 24 is a flowchart illustrating an example of the procedures of the first cleaning process of Step S14 in the flowchart shown in FIG. 21.

Controller 704 controls shutoff valve 333 such that water to be tested that has flowed through ion exchanger unit 220 drains through the third distribution pipe (Step S241). Controller 704 controls shutoff valve 323 such that water to be tested that has flowed through impurity removal unit 210 passes through ion exchanger unit 220 (Step S242). Controller 704 controls shutoff valve 340 such that water to be tested from the ultrapure water production facility passes through impurity removal unit 210 (Step S243). Controller 704 then resets flow meter 600 (Step S244). Controller 704 determines whether the water flow rate measured by flow meter 600 has reached the preset third threshold value (Step S245). Upon determining that the water flow rate measured by flow meter 600 has reached the third threshold, controller 704 performs Step S15.

Figure 25:
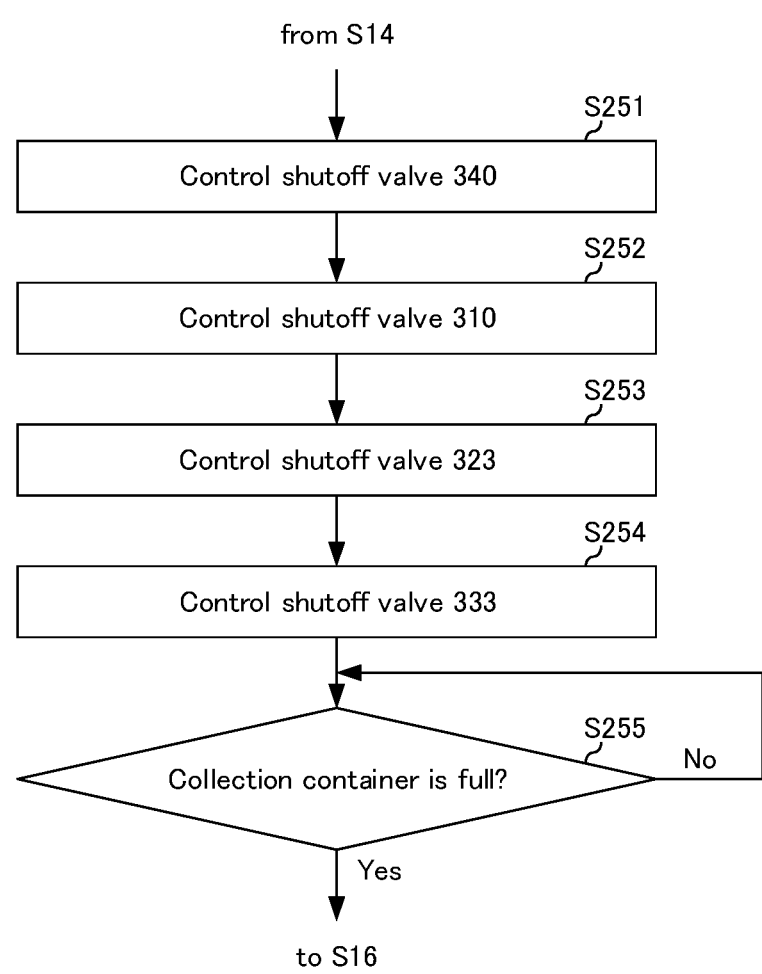
FIG. 25 is a flowchart illustrating an example of the procedures of the regeneration process of Step S15 in the flowchart shown in FIG. 21.

The impurity acquisition system then performs the regeneration process (Step S15). In this embodiment, the functional group of ion exchanger unit 220 is an anion exchange group. Therefore, it is necessary to regenerate ion exchanger unit 220 using an alkaline liquid. FIG. 25 is a flowchart illustrating an example of the procedures of the regeneration process of Step S15 in the flowchart shown in FIG. 21.

First, controller 704 effects control such that shutoff valve 340 closes or such that water to be tested that is supplied from the ultrapure water production facility to the cleaning equipment passes through shutoff valve 310 (Step S251). When controlling shutoff valve 340 such that water to be tested supplied from the ultrapure water production facility to the cleaning equipment passes through shutoff valve 310, controller 704 controls shutoff valve 310 such that water to be tested from shutoff valve 340 drains (Step S252). Controller 704 controls shutoff valve 323 such that regeneration liquid 403 that has been pumped using pump 413 flows through the fifth distribution pipe and passes through to ion exchanger unit 220 (Step S253). Controller 704 controls shutoff valve 333 such that the alkali effluent that has flowed through ion exchanger unit 220 drains to collection container 510, i.e., to the sixth distribution pipe (Step S254). Controller 704 then determines whether the amount of water collected by collection container 510 has reached the preset fourth threshold value (Step S255). This determination process can be the same as the determination process in Step S124 in the fourth embodiment. Upon determining that the amount of water collected by collection container 510 has reached the fourth threshold, controller 704 performs Step S16.

Figure 26:
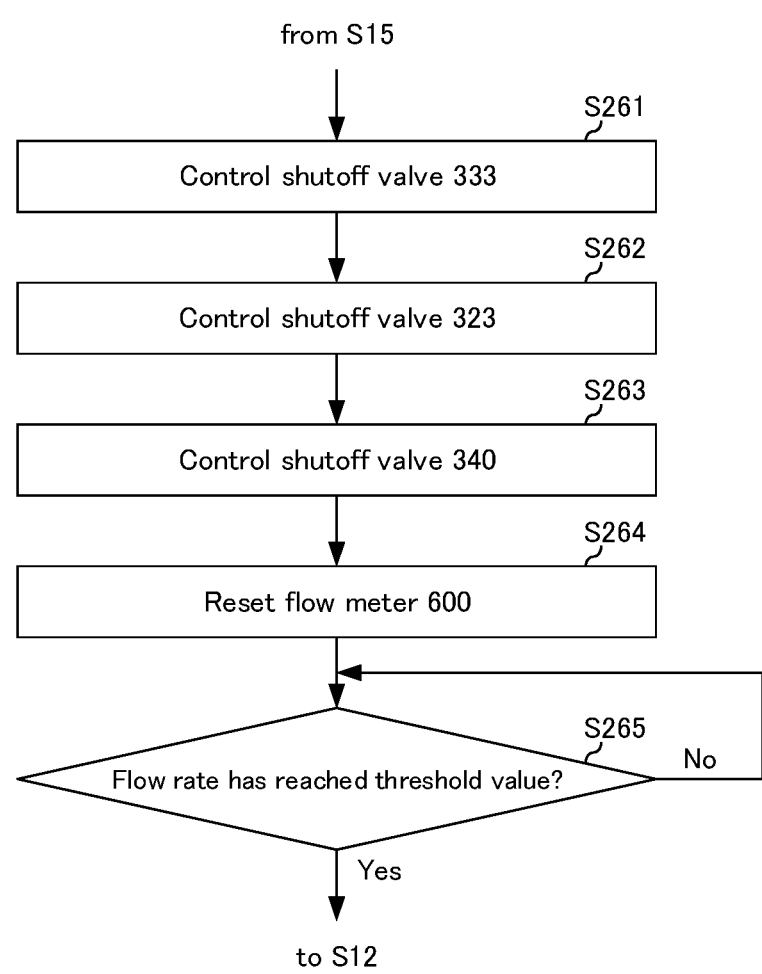
FIG. 26 is a flowchart illustrating an example of the procedures of the second cleaning process of Step S16 in the flowchart shown in FIG. 21.

The impurity acquisition system then performs a cleaning process (second cleaning process) (Step S16). FIG. 26 is a flowchart illustrating an example of the procedures of the second cleaning process of Step S16 in the flowchart shown in FIG. 21.

Controller 704 controls shutoff valve 333 such that water being tested that has flowed through ion exchanger unit 220 drains through the third distribution pipe (Step S261). Controller 704 controls shutoff valve 323 such that water to be tested that has flowed through impurity removal unit 210 passes through to ion exchanger unit 220 (Step S262). Controller 704 controls shutoff valve 340 such that water to be tested from the ultrapure water production facility passes through to impurity removal unit 210 (Step S263). Controller 704 then resets flow meter 600 (Step S264). Controller 704 determines whether the water flow rate measured by flow meter 600 has reached the preset fifth threshold value (Step S265). Upon determining that the water flow rate measured by flow meter 600 has reached the fifth threshold, controller 704 performs Step S12 again. Controller 704 may reset flow meter 600 after performing Step S265 and before performing Step S12. Steps S261 to S263 are processes that do not necessarily need to be performed if each of shutoff valves 323, 333, and 340 is already in an open/closed state that is capable of passing liquid as described above before controller 704 performs the respective processes.

In this way, in this embodiment, controlling the shutoff valves installed at key points in the flow path upon the passage of predetermined periods of time brings about the transitions between processes that include a concentration process in which impurities in the water being tested are captured using ion exchanger unit 220, an elution and collection process in which the captured impurities are eluted from ion exchanger unit 220 and collected, a first cleaning process in which ion exchanger unit 220 from which the impurities have been eluted is cleaned with water to be tested, a regeneration process in which ion exchanger unit 220 is regenerated with alkaline liquid, and a second cleaning process in which ion exchanger unit 220 is further cleaned. This allows a sample to be obtained for testing the quality of the water to be tested without removing ion exchanger unit 220 from the system. As a result, efficient testing of the quality of the water to be tested can be performed. In addition, impurity removal unit 210 is provided to remove impurities from water to be tested that is used for cleaning impurity removal unit 210 in the first and second cleaning processes. This process reduces the concentration of impurities in water to be tested that is used for cleaning.

Sixth Embodiment

Figure 27:
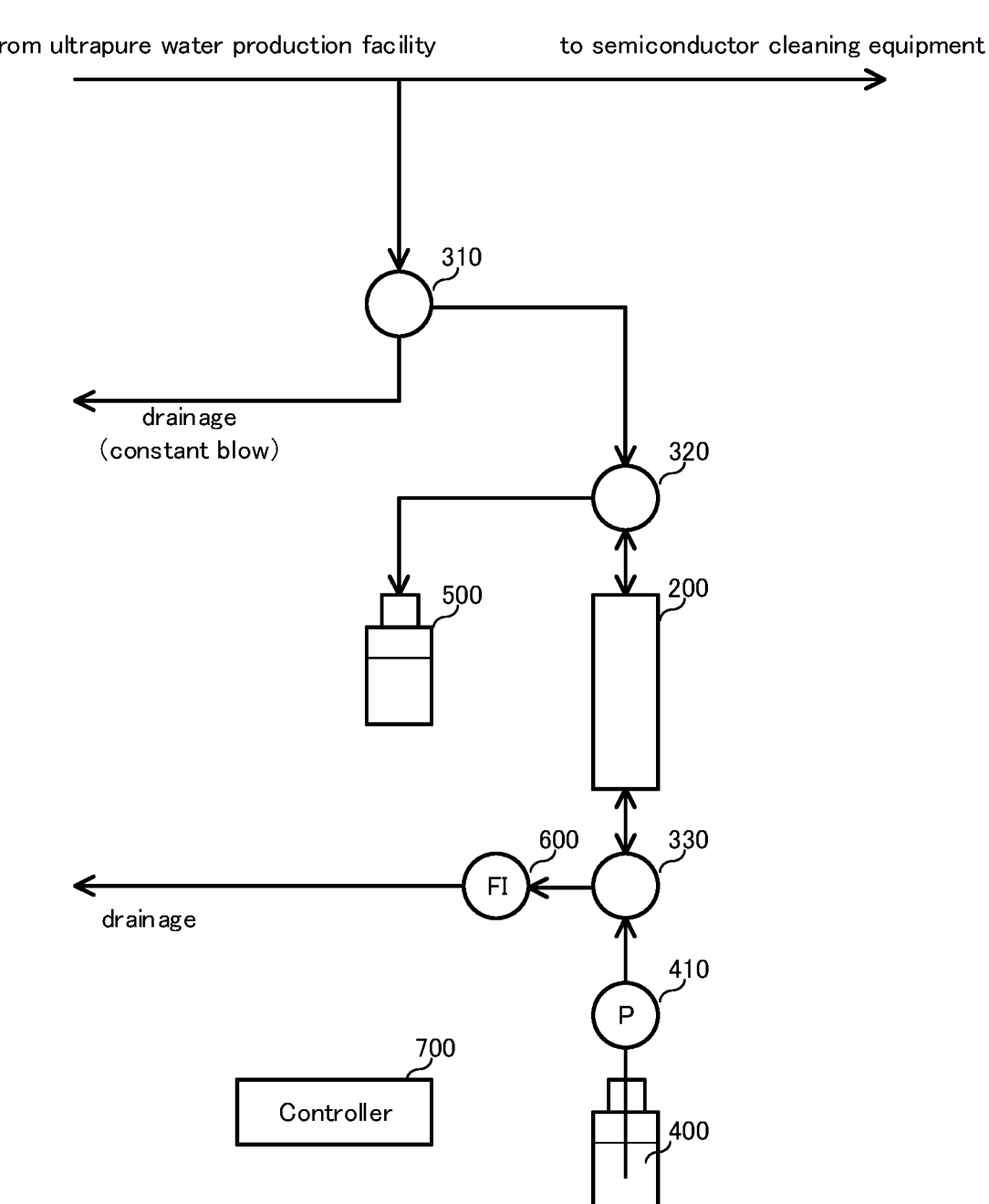
FIG. 27 is a diagram showing a sixth embodiment of an impurity acquisition system of the present invention.

FIG. 27 is a diagram showing a sixth embodiment of an impurity acquisition system of the present invention. As shown in FIG. 27, the impurity acquisition system in this embodiment differs from the first embodiment with respect to the arrangement of eluent 400, pump 410, and collection container 500.

Collection container 500 collects the eluent that passes through the second distribution pipe and from shutoff valve 320 in the first embodiment. Eluent 400 passes through the fourth distribution pipe in the first embodiment to shutoff valve 330 through the use of pump 410. In addition to the functions in the first embodiment, shutoff valve 330 is configured to switch between causing the flow of the liquid being tested that has passed through ion exchanger unit 200 to the third distribution pipe and the flow of eluent 400 that has been caused to pass through the fourth distribution pipe to ion exchanger unit 200. In addition to the functions in the first embodiment, shutoff valve 320 is configured to switch between causing the flow of the liquid to be tested from shutoff valve 310 to ion exchanger unit 200 and the flow of eluent 400 that has passed through ion exchanger unit 200 to the second distribution pipe.

In this configuration, controller 700 switches shutoff valve 320 such that eluent 400 that has passed through ion exchanger unit 200 passes through to the second distribution pipe, and switches shutoff valve 330 such that eluent 400 that has passed through the fourth distribution pipe passes through to ion exchanger unit 200 in the elution process described above. The process used by controller 700 as a trigger to transit from the elution process to the cleaning process can be a process of judging whether the collected eluent has filled collection container 500, a process of judging based on the weight of the entire collection container 500 in which eluent has been collected, or a process of judging by irradiating collection container 500 with a laser beam. Flow meter 600 may also be installed between ion exchanger unit 200 and collection container 500, and a determination based on whether the flow rate measured by flow meter 600 has reached a preset threshold value may be used by controller 700 as a trigger to transit from the elution process to the cleaning process.

Thus, this embodiment is configured to cause the eluent to flow in a direction opposite to the flow of the eluent used in the elution process in the first embodiment. This allows the elution process to be realized in other ways than in the first embodiment.

Seventh Embodiment

Figure 28:
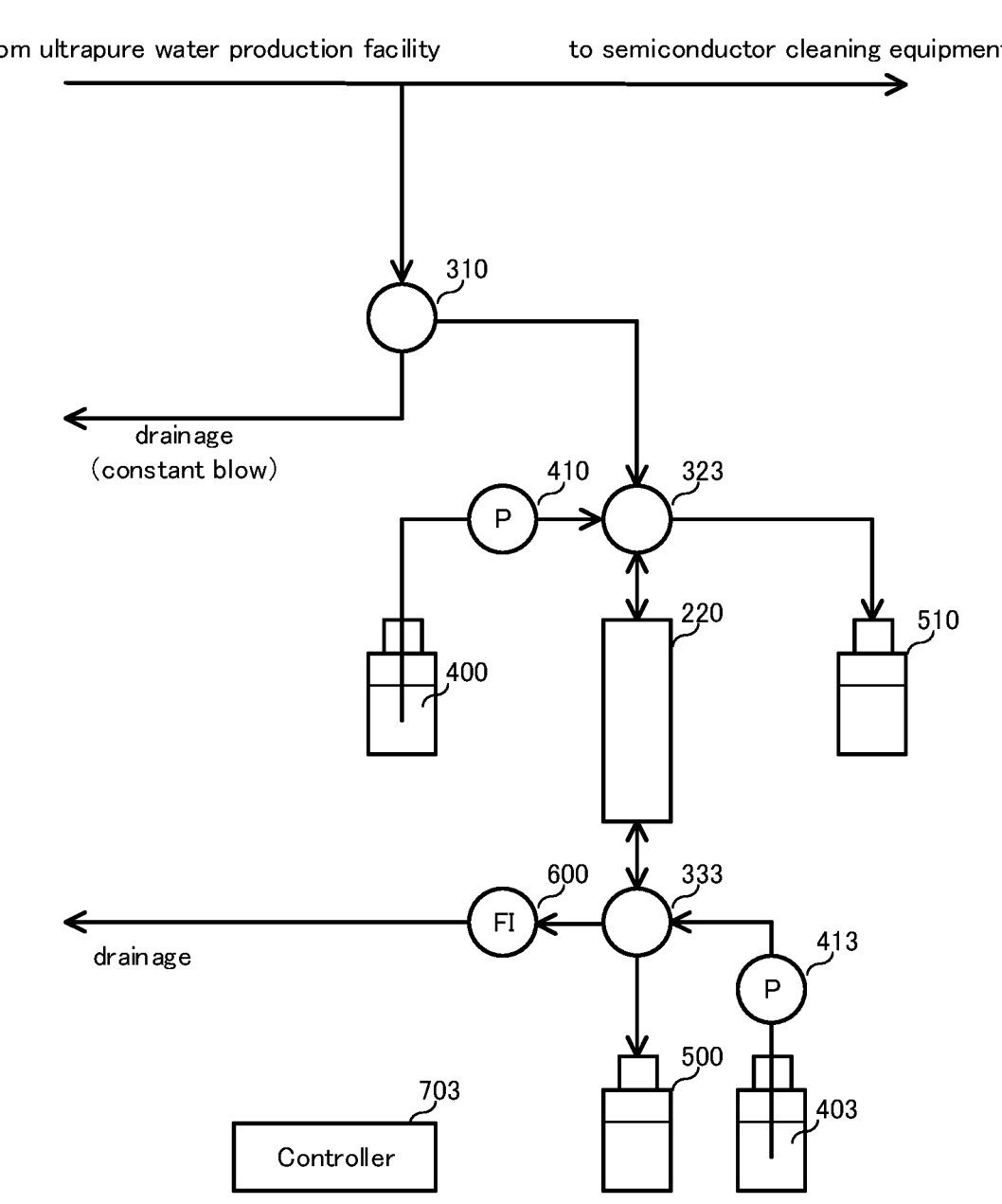
FIG. 28 is a diagram showing a seventh embodiment of an impurity acquisition system of the present invention.

FIG. 28 is a diagram showing a seventh embodiment of an impurity acquisition system of the present invention. As shown in FIG. 28, the impurity acquisition system in this embodiment differs from the fourth embodiment with respect to the arrangement of regeneration liquid 403, pump 413, and collection container 510.

Collection container 510 collects the regeneration liquid that passes from shutoff valve 323 through the fifth distribution pipe in the fourth embodiment. Regeneration liquid 403 passes through the sixth distribution pipe in the fourth embodiment to shutoff valve 333 through the use of pump 413. In addition to the functions in the fourth embodiment, shutoff valve 333 is configured to switch between causing the flow of the liquid being tested through ion exchanger unit 220 to the third distribution pipe, the flow of the eluent that has passed through ion exchanger unit 220 to the fourth distribution pipe, and the flow of the regeneration liquid that has passed through the sixth distribution pipe to ion exchanger unit 220. In addition to the functions in the fourth embodiment, shutoff valve 323 is configured to switch between causing the flow of the liquid to be tested from shutoff valve 310 to ion exchanger unit 220, the flow of eluent 400 that has been pumped by pump 410 through the second distribution pipe to ion exchanger unit 220, and the flow of regeneration liquid 403 through ion exchanger unit 220 to the fifth distribution pipe.

In this configuration, controller 703 switches shutoff valve 323 such that regeneration liquid 403 that has passed through ion exchanger unit 220 passes through the fifth distribution pipe, and switches shutoff valve 333 such that regeneration liquid 403 that has passed through the sixth distribution pipe passes through to ion exchanger unit 220 in the regeneration process described above. The process used by controller 703 as a trigger to transit from the regeneration process to the second cleaning process can be a process of judging whether the recovered regeneration liquid has filled collection container 510, a process of judging based on the weight of the entire collection container 510 in which alkali effluent has been collected, or a process of irradiating collection container 510 with laser light. The process can also be achieved by irradiating collection container 500 with a laser beam. Flow meter 600 may also be installed between ion exchanger unit 220 and collection container 510, and controller 703 may use a determination based on whether the flow rate measured by flow meter 600 has reached a preset threshold value as a trigger for transiting from the regeneration process to the second cleaning process.

Thus, this embodiment is configured to cause the flow of the regeneration liquid in a direction opposite to the flow of the regeneration liquid used in the regeneration process in the fourth embodiment. This allows the regeneration process to be realized in other ways than in the fourth embodiment. In this embodiment, the elution process described in the sixth embodiment may be combined.

Figure 29:
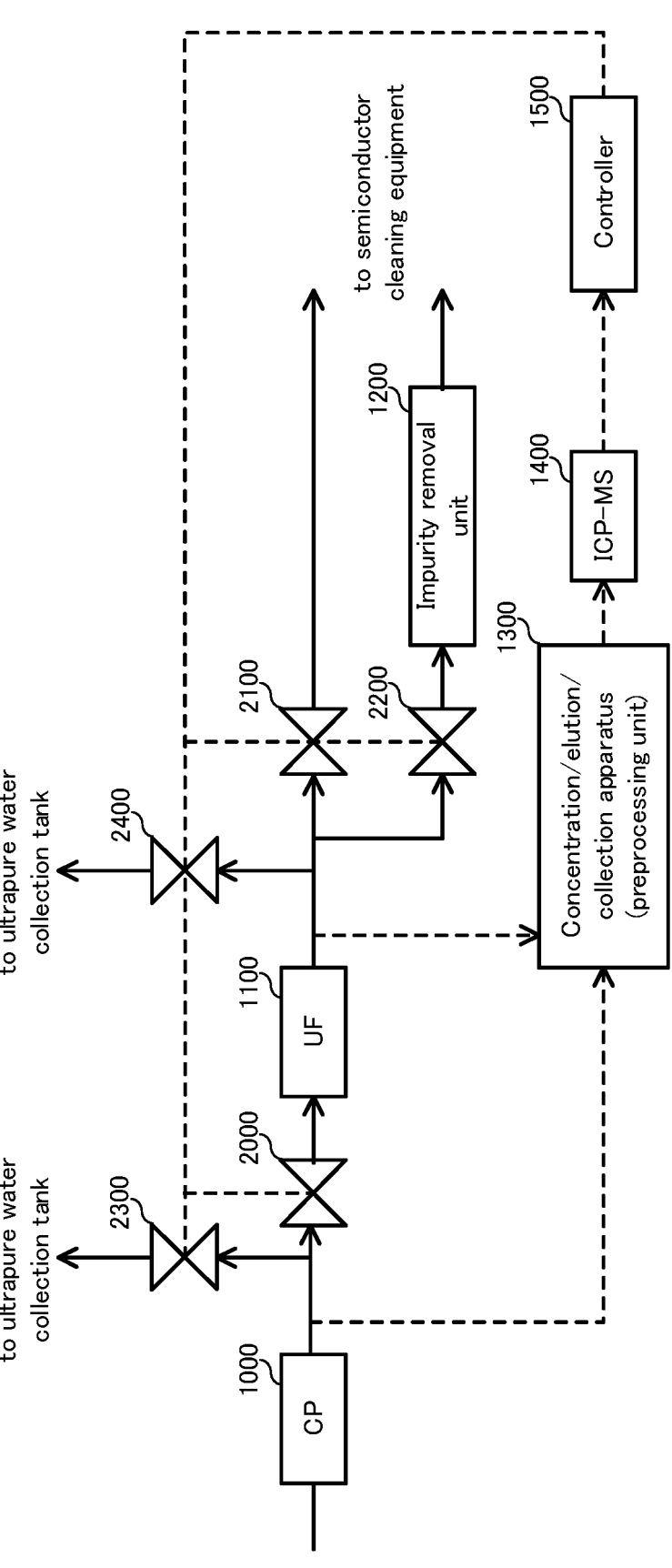
FIG. 29 is a diagram showing an example of a liquid production and supply system in which the impurity acquisition system of the present invention is applied.

An embodiment that uses the impurity acquisition system described above is next described. FIG. 29 is a diagram showing an example of a liquid production and supply system to which the impurity acquisition system of the present invention is applied. The embodiment shown in FIG. 29 is a system in which ultrapure water is supplied to semiconductor cleaning equipment (point of use) via CP 1000, which is a non-regenerative ion exchange device, and UF 1100, which is an ultrafiltration device, in an ultrapure water production facility. Ultrapure water (water to be tested) supplied to CP 1000 is supplied from a liquid production and supply facility located upstream. Liquid production and supply facilities are also facilities that produce ultrapure water. The dashed lines shown in FIG. 29 indicate paths of water flow or control signals for testing the quality of ultrapure water, which is the water to be tested.

There are two flow paths through which ultrapure water is supplied to the semiconductor cleaning equipment. One of the flow paths includes impurity removal unit 1200, and ultrapure water is thus supplied to the semiconductor cleaning equipment through impurity removal unit 1200. Shutoff valve 2000 is also provided between CP 1000 and UF 1100. Shutoff valve 2300 that controls the collection of ultrapure water from CP 1000 into the ultrapure water collection tank is further provided. Shutoff valve 2400 that controls the collection of ultrapure water from UF 1100 into the ultrapure water collection tank is also provided. In addition, two flow paths for supplying ultrapure water to the semiconductor cleaning equipment are provided with respective shutoff valves 2100 and 2200.

Concentration/elution/collection apparatus 1300 corresponds to the impurity acquisition system shown in FIGS. 1, 6, 8, 13, and 20. Concentration/elution/collection apparatus 1300 performs the processes described in the first to fifth embodiments on the ultrapure water from CP 1000 or UF 1100 that is the water to be tested. ICP-MS 1400 is a device (information processing device) that analyzes the concentration of impurities in the acquired eluent and calculates the concentration of impurities in the water being tested based on the analyzed impurity concentration. ICP-MS 1400 is equipped with an information processing function to calculate concentrations. The water quality testing system consists of concentration/elution/collection apparatus 1300 and ICP-MS 1400. Controller 1500 is a second controller that controls the opening and closing of shutoff valves 2000, 2100, 2200, 2300, and 2400 based on the impurity concentrations calculated by ICP-MS 1400.

Controller 1500 effects control to close shutoff valve 2000, which is the fifth shutoff valve, when the impurity concentration calculated by ICP-MS 1400 for the outlet water of CP 1000 exceeds the preset concentration threshold. At this time, controller 1500 effects control to open shutoff valve 2300. When the impurity concentration calculated by ICP-MS 1400 for the outlet water of CP 1000 is less than or equal to the concentration threshold, controller 1500 effects control to open shutoff valve 2000. At this time, controller 1500 effects control to close shutoff valve 2300. When the impurity concentration calculated by ICP-MS 1400 for the outlet water of UF 110 exceeds the preset concentration threshold, controller 1500 effects control to close shutoff valves 2100 and 2200 that are the fourth valve sections. At this time, controller 1500 effects control to open shutoff valve 2400. When the impurity concentration calculated by ICP-MS 1400 for the outlet water of UF 110 is less than or equal to the concentration threshold, controller 1500 effects control to open shutoff valves 2100 and 2200. At this time, controller 1500 effects control to close shutoff valve 2400. Controller 1500 may effect control to open shutoff valve 2100 when the impurity concentration calculated by ICP-MS 1400 for the outlet water of UF 1100 is less than or equal to the first concentration threshold. In this case, controller 1500 effects control such that shutoff valve 2200 opens and shutoff valve 2100 closes when the impurity concentration calculated by ICP-MS 1400 exceeds the first concentration threshold and is less than or equal to the second concentration threshold. When the impurity concentration calculated by ICP-MS 1400 exceeds the second concentration threshold, controller 1500 effects control to close shutoff valves 2100 and 2200. This operation is based on the fact that even if the flow path in which impurity removal unit 1200 is installed has a somewhat high impurity concentration, the impurities in the ultrapure water will be removed by impurity removal unit 1200 and the impurity concentration of the ultrapure water will therefore be lower when supplied to the semiconductor cleaning equipment.

Figure 30:
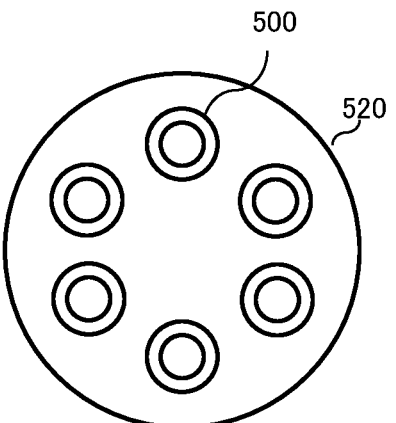
FIG. 30 is a diagram showing an embodiment of the arrangement of the collection container that collects the eluent supplied to the ICP-MS shown in FIG. 29.

FIG. 30 is a diagram showing an embodiment of the arrangement of the collection container that collects the eluent supplied to ICP-MS 1400 shown in FIG. 29. A plurality of collection containers 500 described in the first to fifth embodiments is arranged on autosampler 520, as shown in FIG. 30. Once eluent is collected in collection container 500 in one elution collection process described above, autosampler 520 rotates to a position at which eluent is collected in another collection container (e.g., an adjacent collection container) in the next elution collection process. The eluent is automatically aspirated from collection container 500 from which the eluent was collected and subjected to control to supply the eluent to ICP-MS 1400. For example, a suction device that draws eluent from collection container 500 may detect that eluent has been collected in collection container 500 and that the eluent collection process is complete, whereupon the suction device may start drawing eluent from collection container 500 to supply the eluent to ICP-MS 1400.

Figure 31:
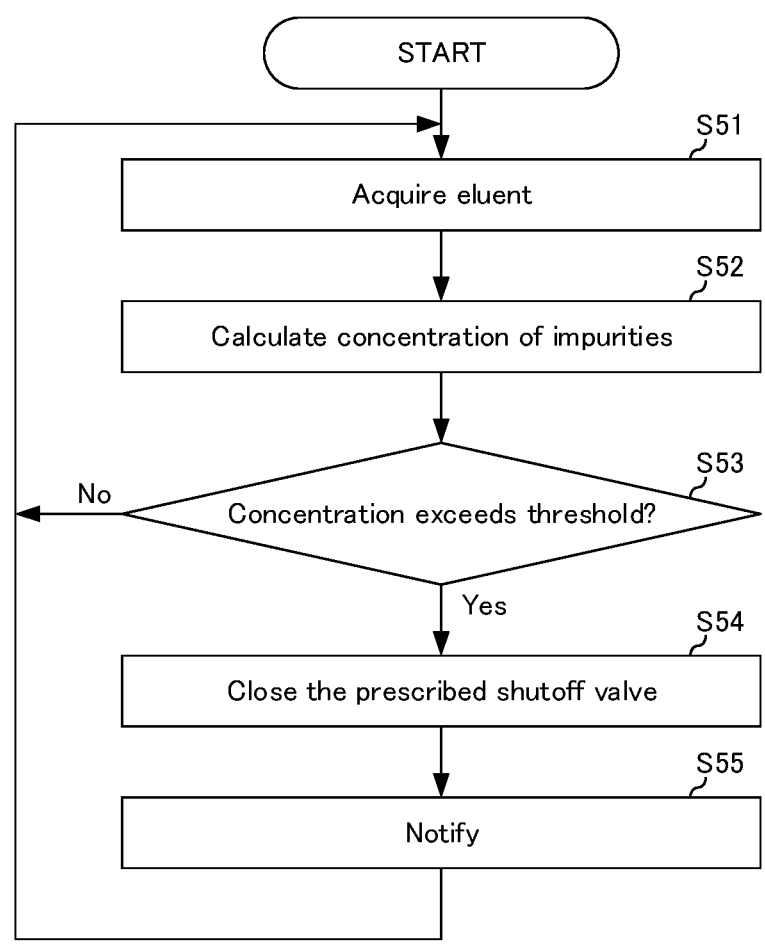
FIG. 31 is a flowchart illustrating an example of the procedures in the system shown in FIG. 29.

The process in the system shown in FIG. 29 is next described. FIG. 31 is a flowchart illustrating an example of the procedures in the system shown in FIG. 29. The following is an example of how ICP-MS 1400 calculates impurity concentrations for the outlet water of UF 1100 shown in FIG. 29. First, ICP-MS 1400 acquires the eluent of the outlet water of UF 1100, which is collected in collection container 500 (Step S51). This acquisition method can be carried out using the suction device described above. ICP-MS 1400 then measures the concentration of impurities in the acquired eluent (Step S52). Concentration information indicating the measured concentration is sent from ICP-MS 1400 to controller 1500. Controller 1500 determines whether the concentration indicated by the transmitted concentration information exceeds the preset concentration threshold (Step S53). When the concentration indicated by the transmitted concentration information exceeds the concentration threshold, controller 1500 closes the prescribed shutoff valves (Step S54). The prescribed shutoff valves are, for example, shutoff valves 2100 and 2200, these being shutoff valves that prevent ultrapure water from the ultrapure water production facility from being supplied to the semiconductor cleaning equipment. At this time, controller 1500 may open shutoff valve 2400 and thus cause ultrapure water to be supplied to the ultrapure water collection tank. Controller 1500 then notifies the user that the concentration indicated by the transmitted concentration information exceeds the concentration threshold (Step S55). This notification is directed to the administrator or operator of the system or to the manager of the ultrapure water production facility and may be output such as information reporting the relevant data or a display on a screen. Step S51 is then performed for the next collection container. Here, as described above, there may be two threshold values to compare with the concentration, and controller 1500 may control the opening and closing of shutoff valves 2100 and 2200 based on the results of comparing the concentration with each of the two threshold values. The specific method of this control was previously described. The same process described above is also used when ICP-MS 1400 calculates impurity concentrations for the outlet water of CP 1000 shown in FIG. 29.

Figure 32:
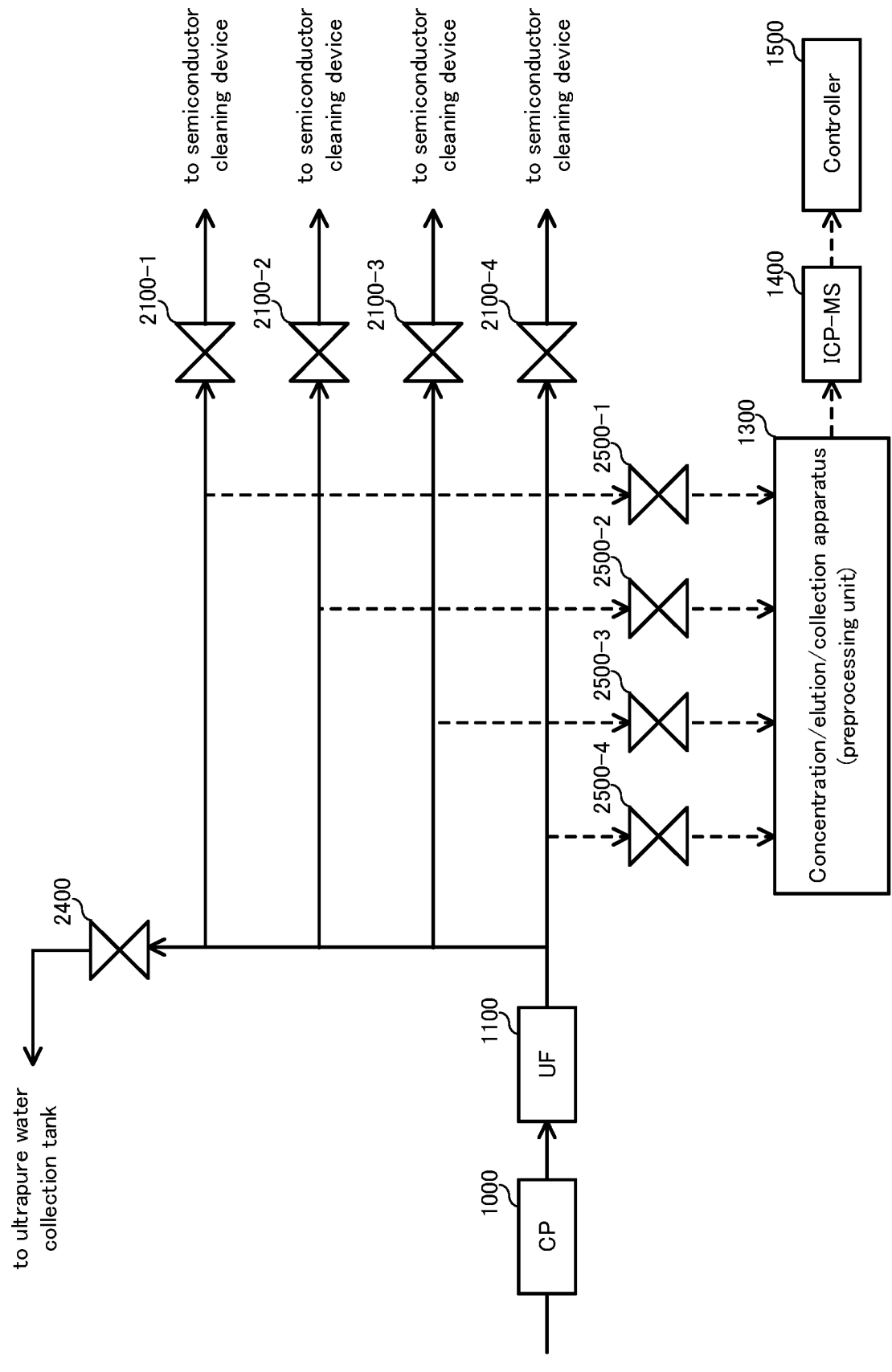
FIG. 32 is a diagram showing another example of a liquid production and supply system to which the impurity acquisition system of the present invention is applied.

FIG. 32 is a diagram showing another example of a liquid production and supply system in which the impurity acquisition system of the present invention is applied. In the application example shown in FIG. 32, CP 1000, UF 1100, concentration/elution/collection apparatus 1300, ICP-MS 1400, controller 1500, and shutoff valve 2400 are each the same as CP 1000, UF 1100, concentration/elution/collection apparatus 1300, ICP-MS 1400, controller 1500, and shutoff valve 2400, respectively, shown in FIG. 29. Ultrapure water, which is the outlet water of UF 1100, is distributed to multiple flow paths and supplied to multiple semiconductor cleaning devices connected to each of the flow paths. Each of the multiple flow paths has a branch flow path to concentration/elution/collection apparatus 1300, and the ultrapure water flowing in each of the flow paths is processed as described in the first to fifth embodiments in concentration/elution/collection apparatus 1300 as ultrapure water to be tested. Controller 1500 controls the selection of which treatment and which flow path of ultra-pure water by opening and closing shutoff valves 2500-1 to 2500-4 on each of the branch flow paths. As in the process described above, controller 1500 also controls the opening and closing of the fifth shutoff valves 2100-1 to 2100-4 that are the fifth valves in the respective flow paths based on the impurity concentrations calculated by ICP-MS 1400. Controller 1500 has threshold values for each of the multiple semiconductor cleaning devices, and controller 1500 controls the opening and closing of shutoff valves 2100-1 to 2100-4 based on comparisons of the impurity concentrations calculated by ICP-MS 1400 and the threshold values for the respective semiconductor cleaning devices.

Thus, when the concentration of impurities in the ultrapure water exceeds a predetermined concentration threshold, the supply of ultrapure water to the semiconductor cleaning devices is prevented by controlling the shutoff valves. This prevents contamination of semiconductor devices and components in ultrapure water facilities. The liquid (water) to be measured is not limited to ultrapure water but can also be a chemical solution such as IPA (isopropyl alcohol), PGMA (polyglycerol methacrylate), and PGMEA (propylene glycol monomethyl ether acetate). Although a bottle is used to collect the eluent, the eluent can also be sprayed directly into the analyzer for quantitative analysis. The concentrations of metal impurities to be measured in this impurity acquisition system are not particularly limited, but should be less than 100 ng/L, preferably less than 1 ng/L, and even more preferably less than 0.1 ng/L.

Although described above by allocating each function (processing) to a respective component, these assignments are not limited to those described above. In addition, as for the configuration of the components, the above-described embodiments are merely examples, and the present invention is not limited thereto. Further, the present invention may be a combination of the embodiments.

While the present invention has been described with reference to the embodiments, the present invention is not limited to the above embodiments. Various changes within the scope of the present invention that will be understood by those skilled in the art can be made in the configuration and details of the present invention.

This application claims priority based on JP 2021-17488, filed Feb. 5, 2021, and incorporates all of its disclosure herein.

What is claimed is:

1. An impurity acquisition system for acquiring impurities in a liquid to be tested, comprising:

an adsorbent that adsorbs impurities in the liquid to be tested; and a first controller that switches at least one valve between the flow of the liquid to be tested into the adsorbent, a regeneration liquid into the adsorbent, and the flow of eluent into the adsorbent for eluting the impurities adsorbed on the adsorbent;

a flow rate acquisition unit that acquires a flow rate of fluid that has passed through the adsorbent from any of the liquid to be tested into the adsorbent, the regeneration liquid into the adsorbent, or the flow of the eluent into the adsorbent, wherein the first controller controls the at least one valve to switch between the flow of liquid to be tested into the adsorbent and the flow of the eluent into the adsorbent based on the flow rate acquired by the flow rate acquisition unit;

wherein the first controller controls the at least one valve to execute:

a concentration process where the first controller controls the at least one valve to direct the liquid to be tested to pass through the adsorbent;

an elution process where the first controller controls the at least one valve to direct the eluent to pass through the adsorbent when the flow rate acquired by the flow rate acquisition unit indicates that an amount of the liquid to be tested directed to the adsorbent and passing through the adsorbent reaches a first threshold value;

a first cleaning process where the first controller controls the at least one valve to direct a cleaning liquid for cleaning the adsorbent to pass through the adsorbent when, in the elution process, the flow rate acquired by the flow rate acquisition unit indicates that an amount of the eluent directed to the adsorbent and passing through the absorbent reaches a second threshold value;

a regeneration process where the first controller controls the at least one valve to direct the regeneration liquid for regenerating the adsorbent to pass through the adsorbent when the flow rate acquired by flow rate acquisition unit indicates an amount of cleaning liquid directed to the adsorbent and passing through the absorbent has reached a third threshold value; and a second cleaning process where the first controller controls the at least one valve to direct the cleaning liquid to pass through the adsorbent when, in the regeneration process, the flow rate acquired by the flow rate acquisition unit indicates that the regeneration liquid directed to the adsorbent and passing through the absorbent reaches a fourth threshold value.

2. The impurity acquisition system according to claim 1, further comprising:

an impurity removal unit that removes impurities from the cleaning liquid, wherein the first controller causes the liquid that has passed through the impurity removal unit to be supplied to the adsorbent in the first and second cleaning processes.

3. The impurity acquisition system according to claim 1, wherein a functional group of the adsorbent is a cation or anion exchange group or a chelate compound.

4. A water quality testing system, comprising:

the impurity acquisition system according to claim 1; and an information processing device that analyzes the concentration of impurities in liquid that has passed through the adsorbent from eluent directed to the absorbent and calculates the concentration of impurities in the liquid to be tested based on the concentration of impurities.

5. A liquid production and supply system, comprising:

the water quality testing system according to claim 4;

a valve section that controls supply of the liquid to be tested from a liquid production and supply facility that performs at least one of the production and supply of the liquid to be tested to a point of use where the liquid to be tested is used; and a second controller that controls the valve section based on the concentration of impurities calculated by the information processing device.

6. The impurity acquisition system for acquiring impurities in a liquid to be tested according to claim 1, comprising:

a plurality of adsorbents that are arranged in parallel with each other and that adsorb impurities in the liquid to be tested; and a control device that switches the flow of the liquid to be tested to the plurality of adsorbents.

* * * * *